(12) United States Patent
Takeyama

(10) Patent No.: US 6,636,356 B2
(45) Date of Patent: Oct. 21, 2003

(54) OBSERVATION OPTICAL SYSTEM

(75) Inventor: Tetsuhide Takeyama, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/917,886

(22) Filed: Jul. 31, 2001

(65) Prior Publication Data

US 2002/0039232 A1 Apr. 4, 2002

(30) Foreign Application Priority Data

Aug. 2, 2000 (JP) .......................................... 2000-238879

(51) Int. Cl.⁷ .................. G02B 27/01; G02B 27/42; G03H 1/00
(52) U.S. Cl. ................... 359/565; 359/837; 359/13; 359/16; 359/630; 345/7; 345/8
(58) Field of Search ................... 359/13, 14, 16, 359/630, 631, 837, 565

(56) References Cited

U.S. PATENT DOCUMENTS

| | | | |
|---|---|---|---|
| 4,026,641 A | | 5/1977 | Bosserman et al. |
| 5,257,094 A | | 10/1993 | LaRussa ........................ 359/13 |
| 5,396,349 A | | 3/1995 | Roberts et al. ................ 359/14 |
| 5,513,041 A | | 4/1996 | Togino ......................... 359/631 |
| 5,526,183 A | * | 6/1996 | Chen ........................... 359/629 |
| 5,537,253 A | | 7/1996 | Cox et al. ..................... 359/630 |
| 5,587,836 A | * | 12/1996 | Takahashi et al. .......... 359/630 |
| 5,661,604 A | * | 8/1997 | Kuba ........................... 359/633 |
| 5,768,025 A | * | 6/1998 | Togino et al. ............... 359/630 |
| 5,790,312 A | * | 8/1998 | Togino ........................ 359/631 |
| 6,084,715 A | * | 7/2000 | Aoki et al. ................... 359/627 |
| 6,147,807 A | * | 11/2000 | Droessler et al. ........... 359/633 |
| 6,373,645 B1 | * | 4/2002 | Kamo .......................... 359/834 |
| 6,429,954 B1 | * | 8/2002 | Kasai ............................. 359/13 |
| 6,510,006 B1 | * | 1/2003 | Togino ........................ 359/631 |
| 6,549,332 B2 | * | 4/2003 | Kimura ....................... 359/630 |
| 2002/0041446 A1 | * | 4/2002 | Nagaoka ..................... 359/630 |
| 2002/0105737 A1 | * | 8/2002 | Takahashi et al. .......... 359/834 |

* cited by examiner

Primary Examiner—John Juba
(74) Attorney, Agent, or Firm—Pillsbury Winthrop LLP

(57) ABSTRACT

An observation system having a positive refracting power as a whole comprises a first unit G1 with a positive refracting power and a second unit G2 and forms an exit pupil for observation of an electronic image displayed on an image display element 5. The first unit G1 comprises a prism 4 with a positive refracting power and a transmission-type volume hologram 6 and has an action of imaging an observation image for obtaining a relay image. The second unit G2 is composed of a reflection-type volume hologram 3 and has an action of forming the exit pupil 1 so as to introduce the relay image to an observer. At least one of reflecting surfaces and an exit surface of the prism 4 is shaped as a rotationally asymmetric surface which exerts a power on bundles of rays, to compensate aberrations generated by decentering. Whereby, the observation optical system can be made so compact as to be applicable to an image display apparatus for cellular phones or portable intelligent terminals, and provides a bright view of an electronic image and a see-through image with high definition.

23 Claims, 16 Drawing Sheets

(EXAMPLE) WHERE MEDIUM IS AIR WITH n=1:
$$\Phi_0^{2P} = -r_2 - r_1 < 0$$

FIG.22
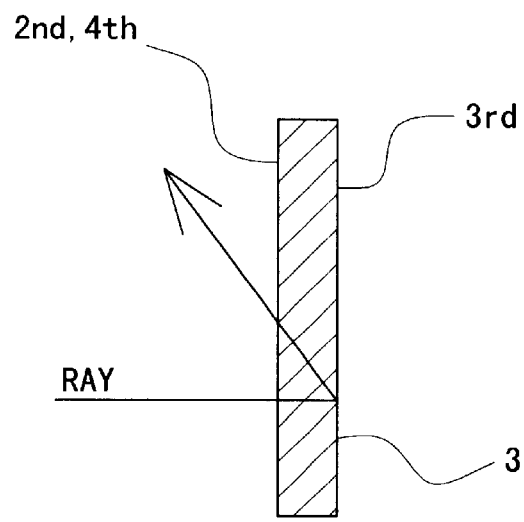
FIG.23A
FIG.23B
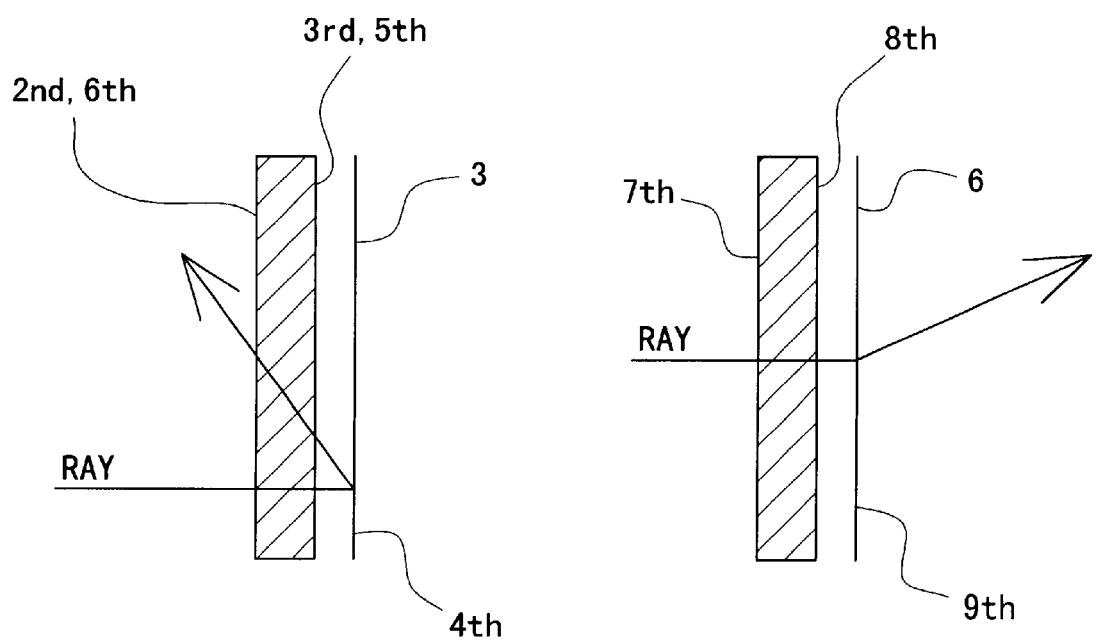

OBSERVATION OPTICAL SYSTEM

BACKGROUND OF THE INVENTION

1) Field of the Invention

The present invention relates to an observation optical system. To be specific, it relates to an observation optical system used in an image display apparatus that can be held on the head or face of an observer and that can be attached to a cellular phone or a portable intelligent terminal.

2) Description of Related Art

In recent years, development has been energetically made for image display apparatuses, specifically for those to be held on the head or face of individuals for entertaining them with a wide-screen image. Also, in accordance with recent popularization of cellular phone and portable intelligent terminal, requirements for large view of graphics or text data on these apparatuses have grown.

Conventionally, as head-mount image display apparatuses, there are known a type in which an image on an image display element such as a CRT is transmitted via an image transmitting element to an object surface, where the image is projected in the air by a toric reflecting surface (U.S. Pat. No. 4,026,641), and a type in which an image displayed on a liquid crystal display device (LCD) is once imaged in the air via a refraction-type relay optical system and then is introduced into an eye of an observer via an eyepiece optical system constructed of a concave mirror arranged in a decentered manner (Japanese Patent Application Preliminary Publication (KOKAI) No. Hei 6-294943).

However, these types of the head-mount image display apparatus are not suitable for application to a cellular phone or portable intelligent terminal because the observation optical system, specifically the relay optical system arranged on the side of the image display element, is too large.

Also, if see-through function is to be provided, it is necessary to construct an exit pupil-side combiner surface with a half mirror, which causes loss of light for an image from an image display element and for a see-through image.

SUMMARY OF THE INVENTION

Therefore, an object of the present invention is to provide an observation optical system which is made so compact as to be applicable, as an image display apparatus, to a cellular phone or a portable intelligent terminal, and which provides an electronic image and a see-through image with sufficient brightness while achieving high image definition.

An image observation optical system according to the present invention comprises a first unit with a positive refracting power and a second unit, wherein the first unit comprises at least one prism member having a positive refracting power, and the second unit is composed of a diffraction element having a lens function caused by diffraction.

Also, it is desirable that, in the observation optical system, the first unit has an action of imaging an electronic image for obtaining a relay image and the second unit has an action of forming an exit pupil for introducing the relayed image to an observer, wherein the prism member of the first unit comprises at least one decentered prism with decentered surfaces, which has an entrance surface through which bundles of rays emergent from the image display element enter the prism, at least one reflecting surface which reflects the bundles of rays inside the prism, and an exit surface through which the bundles of rays exit out of the prism, at least one of the exit surface and the reflecting surface is shaped as a curved surface which exerts a power on the bundles of rays, and the curved surface is a rotationally asymmetric surface constructed and arranged to compensate aberrations generated by decentering.

Also, according to the present invention, the diffraction element used in the second unit is a reflection-type one.

Also, under the condition where a reflecting surface having a power is decentered from the axial chief ray, which is defined as a ray travelling from the center of the object point via the center of the pupil through the center of the image surface, as traced in the reverse direction, it is desirable that at least one of surfaces included in the prism used in the present invention is shaped as a rotationally asymmetric surface. It is particularly preferred that at least one reflecting surface of the prism member is shaped as a rotationally asymmetric surface in view of compensation of aberrations.

In this case, the reflecting surface formed on the prism member may be configured as a plane-symmetric free curved surface defining only one plane of symmetry.

It is also desirable that the surface of the diffraction element used in the present invention is shaped as a rotationally asymmetric surface. The base surface on which the diffraction element is provided may be shaped as any one of a cylindrical surface, a spherical surface, an aspherical surface, an anamorphic surface, a toric surface, a surface that defines only one plane of symmetry, and a plane-symmetric free curved surface.

Also, a rotationally asymmetric surface used in the present invention may be configured as any one of an anamorphic surface, a toric surface, and a free curved surface that defines only one plane of symmetry. Specifically, the surface is preferably configured as a free curved surface that defines only one plane of symmetry.

Also, according to the present invention, it is desirable that the second unit is constructed to have low diffraction efficiency for rays transmitted therethrough so as not to exert optical power on them.

Also, according to the present invention, it is desirable that the first unit is provided with a diffraction element.

Also, in the second unit, it is desirable to use a volume hologram having a rotationally asymmetric power.

In this case, it is desirable that the first unit is provided with a volume hologram surface having a rotationally asymmetric power.

Also, according to the present invention, it is desirable that the diffraction element of the first unit is a transmission-type volume hologram.

Also, it is desirable that the diffraction element of the first unit is formed on the exit surface of the prism member.

Also, according to the present invention, it is preferred that the diffraction element of the first unit is provided with a flare stop.

Also, according to the present invention, it is desirable that the diffraction element of the second unit is a reflection-type volume hologram.

Also, according to the present invention, it is preferred that the diffraction element of the second unit acts as a flare stop also.

Also, according to the present invention, it is preferred that the prism member has at least two reflecting surfaces constructed and arranged to reflect bundles of rays inside the prism, wherein the two reflecting surfaces are shaped as curved surfaces to exert an optical power on the bundles of rays and the curved surfaces are rotationally asymmetric surfaces constructed and arranged to compensate aberrations generated by decentering.

Also, according to the present invention, it is preferred that the prism member is configured so that the direction of the axial chief ray as emergent from the prism member is averted from the exit pupil.

In this case, it is preferred the direction of the axial chief ray as emergent from the prism member satisfies the following condition (1):

$$-25° \leq \theta \leq 25° \quad (1)$$

where θ is a tilt angle of the axial chief ray in reference to X direction, which is taken as 0°, upon X direction being defined as a direction lying in a plane of decentering of each surface constituting the prism member of the first unit and perpendicularly intersecting Z direction, which is defined by the straight line portion of the axial chief ray from the center of the exit pupil to the entrance surface of the second unit.

In this case, it is much preferred that the following condition (2) is satisfied:

$$-15° \leq \theta \leq 15° \quad (2)$$

Further, it is still much preferred that the following condition (3) is satisfied:

$$-5° \leq \theta \leq 5° \quad (3)$$

Also, according to the present invention, it is desirable to cover the first unit with a dust shield member.

In this case, the dust shield member of the first unit is preferably provided with an encasement which accommodates the first unit, and a transparent cover arranged on the exit side of the first unit so that light is introduced into the second unit through the cover.

In this configuration, upon the transparent cover being made of transparent material such as glass or plastic, the diffraction element of the first unit is preferably provided on a surface of the transparent cover, using it as a base, from inside the encasement.

Also, an image display element, a main frame in which any one of the above-mentioned observation optical system of the present invention is arranged as an eyepiece optical system, and a support member which is constructed to be mounted on the lateral sides of the head of an observer so as to hold the main frame in front of the face of the observer can be combined into a head-mount type image display apparatus.

In this case, the head-mount type image display apparatus may be configured so that the observation optical system and spectacle lenses are integrally arranged in the main frame.

Alternatively, the head-mount type image display apparatus may be configured so that the support member is constructed to achieve removable mount to side frames of spectacles.

Also, a pair of the observation optical systems can be arranged in parallel as left and right systems so as to configure a head-mount type binocular image display apparatus.

This and other objects as well as features and advantages of the present invention will become apparent from the following detailed description of the preferred embodiments when taken in conjunction with the accompanying drawings.

BRIEF DESCRIPTION OF THE DRAWINGS

Each of FIGS. 18A–18C is a horizontal sectional view of a head-mount type binocular image display apparatus using the observation optical system according to the present invention, where

FIG. 22 is a schematic view to show how to read the numerical data of the first embodiment.

FIGS. 23A–23B are schematic views to show how to read the numerical data of the second embodiment.

DETAILED DESCRIPTION OF THE PREFERRED EMBODIMENTS

Figure 1:
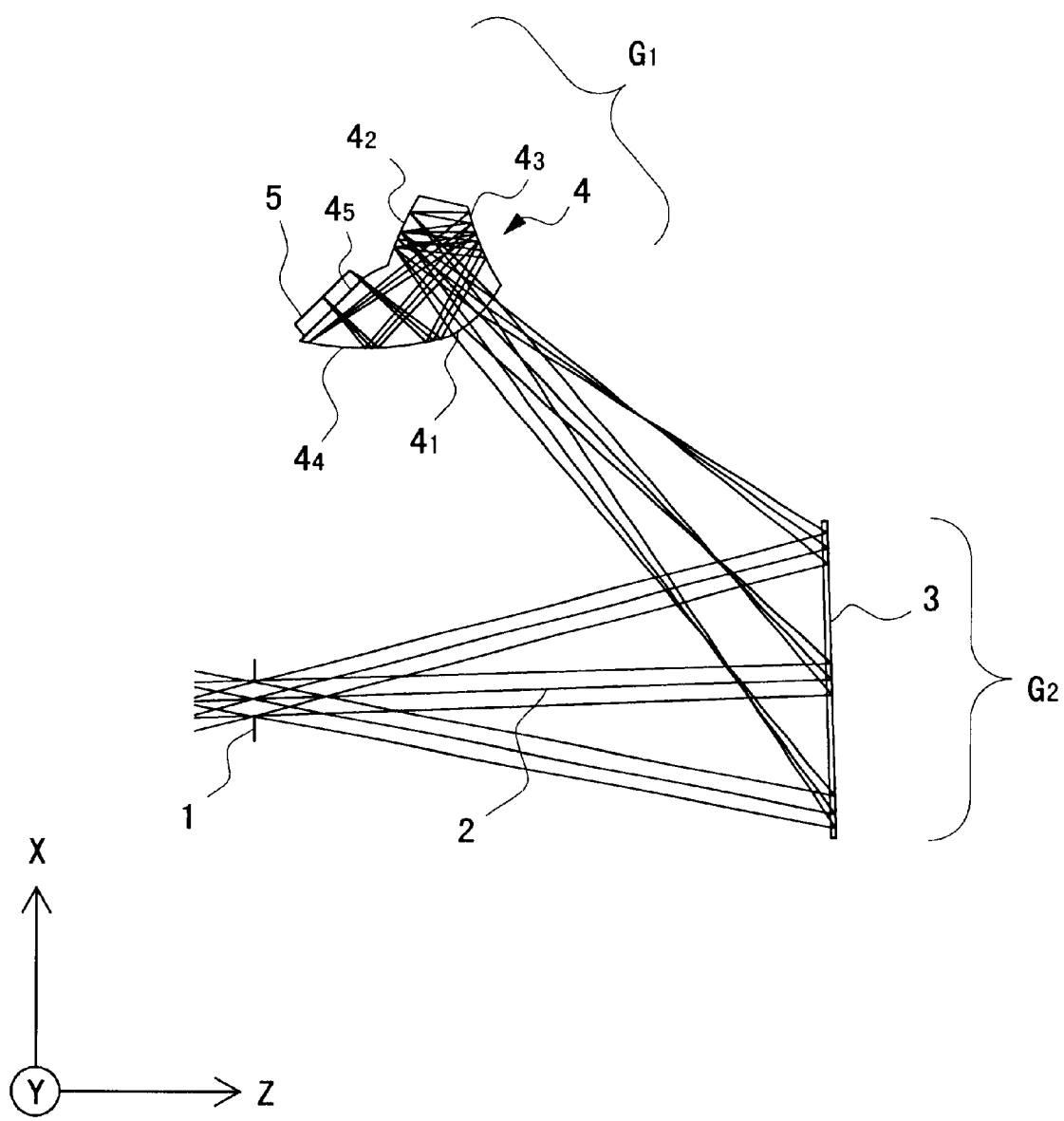
FIG. 1 is a sectional view of an observation optical system according to the first embodiment of the present invention.

Preceding the descriptions of the individual embodiments, explanation will be made of the reasons and effects of the above-summarized features of the present invention.

According to the present invention, a first unit having a prism member and a second unit composed of a diffraction element constitute an observation optical system that forms an exit pupil for observation of an image displayed on an image display element and that has a positive refracting power as a whole, so as to achieve size reduction and resolution improvement of the apparatus. To be specific, use of a diffraction element in the second unit enables the second unit to be thin and compact. Also, use of a prism member having rotationally asymmetric surfaces facilitates size reduction of the relay optical system section because a common region for the deflected path is repeatedly traversed.

Where the first unit is configured to have an action of imaging the observation image as a relay image and the second unit is configured to form an exit pupil for introducing the relay image to the observer, the distance from the apparatus to the eye of the observer, or the eye relief, can be secured long while the focal length of the second unit is maintained to be long. This configuration allows the observer to use the apparatus while wearing spectacles, and thus diopter adjustment is not necessary.

Also, since reflecting surfaces are more sensitive to decentering error than refracting surfaces are, high adjustment accuracy is required in assembling them. However, positional relationship between surfaces of a prism is fixed. Therefore, decentering adjustment is required simply for a unit prism and thus requirement for extremely high accuracy or large man-hour for adjustment is obviated.

Furthermore, since a prism has an entrance surface and an exit surface which are refracting surfaces and a reflecting surface, compensation for aberrations can be designed more flexibly than in the case of a mirror, which consists of a reflecting surface.

Also, where the diffraction element used in the second unit is a reflection type one and is disposed on the exit side of the first unit to face the exit pupil so that the intermediate image formed by the first unit is introduced to the observer by reflection, a compact observation optical system can be attained.

If none of reflecting surfaces is decentered from the axial chief ray, the path of the axial chief ray incident on the reflecting surfaces coincides with the path of the axial chief ray reflected therefrom and thus the axial chief ray is interrupted in the optical system. As a result, a beam of rays with its central portion being interrupted is used for image formation and thus the image becomes dark at its center or image formation completely fails at the center.

Therefore, an optical system has to be decentered in a configuration where a common region for the path is repeatedly traversed by the folded path. However, where the decentered optical system for folding the path is employed, decentered aberrations such as the rotationally asymmetric distortion and the rotationally asymmetric curvature of field could be produced. It is desirable to use rotationally asymmetric surfaces for the purpose of compensating such decentered aberrations. The surface of the diffraction element is preferably shaped rotationally asymmetric by the similar reason.

Also, the configuration where the second unit exerts no optical power on bundles of rays transmitted therethrough with a low diffraction efficiency for them allows an observer to perform see-through observation. The observer can carry on wearing a head- or face-mount type image display apparatus using the observation optical system of the present invention without sacrificing the view of external real environment. In short, the observer is not bothered to take off and on the apparatus during use.

This configuration is applicable to image superposition mode where an image from the image display element and an image from the external environment can be simultaneously viewed as overlapped images.

If see-through observation is to be performed, the base surface of the diffraction element of the second unit has to be made of transparent material such as glass or plastic.

A diffraction element generates relatively large chromatic aberration, and has the property of generating larger chromatic aberration for larger refractive index. Thus, a single diffraction element provided only for the second unit renders chromatic aberration appearing in reflected light large. Therefore, under the condition where the first unit also is provided with a diffraction element as in the present invention, the diffraction element of the first unit can be configured to generate a chromatic aberration having inverse tendency to the chromatic aberration generated by the diffraction element of the second unit, so that the effect of the chromatic aberration derived from the diffraction element of the first unit can cancel the chromatic aberration derived from the diffraction element of the second unit.

In the second unit, it is desirable to use a volume hologram surface having a rotationally asymmetric power to bend the path so that bundles of rays could avoid the face, spectacles or the like. Also, for compensation of the rotationally asymmetric chromatic aberration generated at the volume hologram with a rotationally asymmetric power of the second unit, it is desirable that the first unit is provided with a volume hologram surface having a rotationally asymmetric power.

Regarding the hologram element, there are two types; i.e. a relief hologram and a volume hologram. The relief hologram has the property of low selectivity with respect to incident angle and low selectivity with respect to wavelength. Thus, the relief hologram diffracts rays with a particular wavelength incident thereon at a particular angle and images them as desired order rays, while diffracting, at a low diffraction efficiency, other rays with different wavelengths incident thereon at different angles and imaging them as undesired order rays. In contrast, the volume hologram has the property of high selectivity with respect to incident angle and high selectivity with respect to wavelength. Thus, the volume hologram exclusively diffracts rays with a particular wavelength incident thereon at a particular angle, while transmitting the remaining rays as $0^{th}$ order rays so that undesired order rays should hardly be imaged.

Therefore, if a transmission-type volume hologram is used as the hologram element of the first unit as in the present invention, image blur because of undesired order rays is obviated, and thus a clear image can be provided for observation.

Also, according to the present invention, if the diffraction element of the first unit is provided on the exit surface of the prism member, assembly work is facilitated and productivity is improved. Specifically, if the diffraction element is integrally formed with the prism member, positional shift between the prism and the diffraction element is precluded.

Also, according to the present invention, if the diffraction element of the first unit is provided with a flare stop, flare can be precluded. Specifically, if configuration is made so that the periphery of the diffraction element acts as a flare stop also, extra space for accommodating a separate flare stop is saved.

As discussed above, the volume hologram has high selectivity with respect to incident angle and high selectivity with respect to wavelength. Thus, the volume hologram exclusively diffracts rays with particular wavelengths incident thereon at particular angles, while transmitting the remaining rays as 0th order rays so that undesired order rays should hardly be imaged.

Therefore, if a reflection-type volume hologram is used as the diffraction element of the second unit as in the present invention, a duplicated image caused by undesired order rays could be prevented, and resultantly a clear image is observable.

Also, according to the present invention, if the diffraction element of the second unit is constructed to act as a flare stop also, flare is precluded. In addition, extra space for accommodating a separate flare stop is saved.

Also, according to the present invention, the prism member is arranged to satisfy, preferably Condition (1), much preferably Condition (2), or still much preferably Condition (3) so that the axial chief ray is emergent from the prism member in a direction averted from the exit pupil. Whereby, unwanted light from the prism is prevented from entering the eye of the observer.

Also, if configuration is made so that the first unit is covered with the dust shield member as in the present invention, dust or the like is prevented from being visible as an enlarged image. Also, in the first unit, which has a diffraction element, the dust shield member can protect the diffraction element from moisture outside, which could cause expansion of the diffraction element and change of the peak wavelength regarding diffraction.

Next, descriptions will be made of the structure and arrangement of the optical surfaces used in the present invention.

In the image observation optical system according to the present invention, the axial chief ray is defined as a ray travelling from the center of the exit pupil through the center of the image display element. The optical axis, which is defined by the straight line portion of the axial chief ray from the center of the exit pupil to the surface of the second unit, is defined as Z axis. The axis that intersects Z axis at right angles and that lies in a plane of decentering for each surface constituting the prism member of the first unit is defined as X axis. The axis that intersects Z axis at right angles and that intersects X axis at right angles is defined as Y axis. The center of the exit pupil is determined as the origin of the coordinate system for the observation optical system of the present invention. Also, according to the present invention, surface arrangement numbers are assigned in order from the exit pupil through the image display element to conform to the reverse ray tracing. A direction of the axial chief ray from the exit pupil toward the image display element is defined as a positive direction of Z axis. A direction of X axis that is toward the image display element is defined as a positive direction of X axis. A direction of Y axis that forms a right-hand system along with X axis and Z axis is defined as a positive direction of Y axis.

Here, a free curved surface used in the present invention is defined by the following equation (4) where Z axis appearing therein is the axis of the free curved surface:

$$Z = cr^2 / \{1 + \sqrt{1 - (1+k)c^2r^2}\} + \sum_{j=2}^{66} c_j X^m Y^n \quad (4)$$

The first term of Equation (4) expresses the spherical surface component. The second term of Equation (4) expresses the free curved surface component. In the term of the spherical surface component, c represents a curvature at the vertex, k represents a conic constant, and $r = \sqrt{X^2 + Y^2}$.

The term of the free curved surface component is expanded as shown in the following equation (5):

$$\sum_{j=2}^{66} C_j X^m Y^n = C_2 X + C_3 Y + C_4 X^2 + C_5 XY + C_6 Y^2 + C_7 X^3 + \quad (5)$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

where $C_j$ (j is integer equal to or greater than 2) is a coefficient.

In general, a free curved surface as expressed above does not have a plane of symmetry along X-Z plane or along Y-Z plane. However, according to the present invention, upon all terms with odd-numbered powers of X being nullified, the free curved surface can define only one plane of symmetry that is parallel to Y-Z plane. Such a free curved surface is obtained, for example, by setting values of the coefficients $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$ . . . of the terms in Equation (4) at zero.

Alternatively, upon all terms with odd-numbered powers of Y being nullified, the free curved surface can define only one plane of symmetry that is parallel to X-Z plane. Such a free curved surface is obtained, for example, by setting values of the coefficients $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$ . . . of the terms in Equation (4) at zero.

Also, a free curved surface that defines one of the above-mentioned planes of symmetry is arranged so that its plane of symmetry corresponds to the decentering direction of the optical system. That is, a free curved surface defining a plane of symmetry parallel to Y-Z plane is combined with an optical system having decentering direction along Y axis, and a free curved surface defining a plane of symmetry parallel to X-Z plane is combined with an optical system having decentering direction along X axis, to effectively compensate rotationally asymmetric aberrations caused by decentering and to improve facility for fabrication.

Equation (4) is presented as one example that can define a free curved surface. Even if the free curved surface having only one plane of symmetry according to the present invention is defined by any different expression, it is still effective in compensation of rotationally asymmetric aberrations caused by decentering and in improvement of facility for fabrication, as a matter of course.

For instance, the free curved surface can be defined by Zernike polynomial, also. The configuration of the surface is defined by the following equations (6). Z axis appearing in Equation (6) represents the axis of Zernike polynomial. The rotationally asymmetric surface is defined by height in Z axis, in terms of polar coordinate, in reference to X-Y plane.

$$X = R \times \cos(A) \quad (6)$$
$$Y = R \times \sin(A)$$
$$Z = D_2 + D_3 R\cos(A) + D_4 R\sin(A) + D_5 R^2 \cos(2A) +$$
$$D_6(R^2 - 1) + D_7 R^2 \sin(2A) + D_8 R^3 \cos(3A) +$$
$$D_9(3R^3 - 2R)\cos(A) + D_{10}(3R^3 - 2R)\sin(A) +$$
$$D_{11} R^3 \sin(3A) + D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22} R^5 \sin(5A) + D_{23} R^6 \cos(6A) +$$
$$D_{24}(6R^6 - 5R^4)\cos(4A) + D_{25}(15R^6 - 20R^4 + 6R^2)\cos(2A) +$$
$$D_{26}(20R^6 - 30R^4 + 12R^2 - 1) + D_{27}(15R^6 - 20R^4 + 6R^2)\sin(2A) +$$
$$D_{28}(6R^6 - 5R^4)\sin(4A) + D_{29} R^6 \sin(6A) \ldots$$

where R is a distance from Z axis in X-Y plane, A is an azimuth about Z axis expressed by a rotation angle from Y axis, and $D_m$ (m is integer equal to or greater than 2) is a coefficient. It is noted that Equation (6) corresponds to a free curved surface that is symmetric in X direction.

Configuration of an anamorphic surface is defined by the following equation (7). The normal to the optical surface at the origin of the surface shape is defined as the axis of the anamorphic surface.

$$Z = (C_x \cdot X^2 + C_y \cdot Y^2) / \quad (7)$$
$$1 + \{1 - (1 + K_x) C_x^2 \cdot X^2 - (1 + K_y) C_y^2 \cdot Y^2\}^{1/2}] +$$
$$\sum R_n \{(1 - P_n) X^2 + (1 + P_n) Y^2\}^{(n+1)}$$

Here, if it is assumed that n is from 1 to 4 (polynomial of degree 4), for example, Equation (7) is expanded as the following expression (8):

$$Z = (C_x \cdot X^2 + C_y \cdot Y^2) / \quad (8)$$
$$[1 + \{1 - (1 + K_x) C_x^2 \cdot X^2 - (1 + K_y) C_y^2 \cdot Y^2\}^{1/2}] +$$
$$R_1\{(1 - P_1)X^2 + (1 + P_1)Y^2\}^2 + R_2\{(1 - P_2)X^2 + (1 + P_2)Y^2\}^3 +$$
$$R_3\{(1 - P_3)X^2 + (1 + P_3)Y^2\}^4 + R_4\{(1 - P_4)X^2 + (1 + P_4)Y^2\}^5$$

where Z is an amount of deviation from a plane tangent to the origin of the surface shape, $C_x$ is a curvature in X-axis direction, $C_y$ is a curvature in Y-axis direction, $K_x$ is a conical coefficient in X-axis direction, $K_y$ is a conical coefficient in Y-axis direction, $R_n$ is a rotationally symmetric component of a spherical surface term, and $P_n$ is a rotationally asymmetric component of an aspherical surface term. A radius of curvature $R_x$ in X-axis direction and a radius of curvature $R_y$ in Y-axis direction are correlated with the curvatures $C_x$, and $C_y$, respectively, as follows:

$$R_x = 1/C_x, R_y = 1/C_y.$$

Regarding the toric surface, there are two kinds; i. e. X toric surface and Y toric surface, which are expressed by the following equations (9), (10), respectively. The normal to the optical surface at the origin of the surface shape is defined as the axis of the toric surface.

X toric surface is defined as follows:

$$F(X) = C_x \cdot X^2 / [1 + \{1 - (1 + K)C_x^2 \cdot X^2\}^{1/2}] + \quad (9)$$
$$AX^4 + BX^6 + CX^8 + DX^{10} \ldots$$
$$Z = F(X) + (1/2)C_y\{Y^2 + Z^2 - F(X)^2\}$$

Y toric surface is defined as follows:

$$F(Y) = C_y \cdot Y^2 / [1 + \{1 - (1 + K)C_y^2 \cdot Y^2\}^{1/2}] + \quad (10)$$
$$AY^4 + BY^6 + CY^8 + DY^{10} \ldots$$
$$Z = F(Y) + (1/2)C_x\{X^2 + Z^2 - F(Y)^2\}$$

where Z is an amount of deviation from a plane tangent to the origin of the surface shape, $C_x$ is a curvature in X-axis direction, $C_y$ is a curvature in Y-axis direction, K is a conical coefficient, and A, B, C, and D are aspherical coefficients. A radius of curvature $R_x$ in X-axis direction and a radius of curvature $R_y$ in Y-axis direction are correlated with the curvatures $C_x$, and $C_y$, respectively, as follows:

$$R_x = 1/C_x, R_y = 1/C_y.$$

Configuration of a rotationally symmetric aspherical surface is defined by the following equation (11). Z axis appearing in Equation (11) represents the axis of the rotationally symmetric aspherical surface.

$$Z = (Y^2/R)/[1 + \{1 - P(Y^2/R^2)\}^{1/2}] + A_4 Y^4 + A_6 Y^6 + A_8 Y^8 + A_{10} Y^{10} \ldots \quad (11)$$

where Y is a direction perpendicular to Z, R is a radius of paraxial curvature, P is a conical coefficient, and $A_4, A_6, A_8, A_{10}$ are aspherical coefficients.

Figure 21:
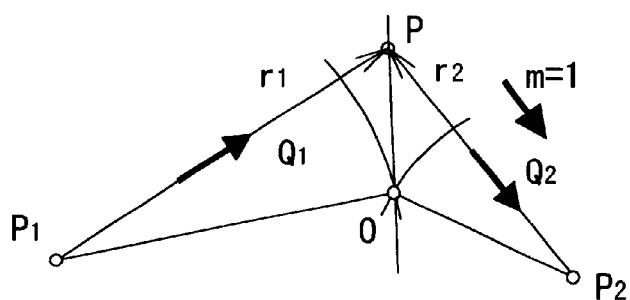
FIG. 21 is a view to show the principle of defining a diffraction element (HOE) according to the present invention.

The diffraction element (HOE) used in the present invention is defined as follows. FIG. 21 is a view to show the principle of defining HOE according to the present invention.

Ray tracing for a ray with wavelength λ incident at and emergent from any point P on the HOE surface is given by the following equation (12), which uses the optical path difference function $\Phi_0$ defined for a reference wavelength $\lambda_0$=HWL on the HOE surface:

$$n_d Q_d N = n_i Q_i N + m(\lambda/\lambda_0)\nabla\Phi_0 \cdot N \quad (12)$$

where N is a vector of the normal to the HOE surface, $n_i$ ($n_d$) is a refractive index on the incident side (emergent side), $Q_i$ ($Q_d$) is a vector (unit vector) of incidence (emergence), and m=HOR is a diffraction order of emergent light.

If the HOE is fabricated (defined) by two point light sources with the reference wavelength $\lambda_0$, specifically by interference between object rays emanating from the point $P_1$=(HY1, HY2, HY3) and reference rays emanating from the point $P_2$(HX2, HY2, HZ2) as shown in FIG. 21, the following equation is satisfied:

$$\Phi = \Phi_0^{2P}$$
$$= n_2 \cdot s_2 \cdot r_2 - n_1 \cdot s_1 \cdot r_1$$

where $r_1$ ($r_2$) is a distance (>0) from the point $P_1$ ($P_2$) to a predetermined coordinate point on the HOE, $n_1$ ($n_2$) is a refractive index of the point $P_1$ ($P_2$)-side medium by which the HOE was arranged during fabrication (definition), $s_1$=HV1, and $s_2$=HV2 are signs to take into consideration the travelling direction of light. In the case where the light source is a divergent light source (real point light source), the sign is set to be REA=+1, while in the case where the light source is a convergent light source (virtual point light source), the sign is set to be VIR=−1. It is noted that in defining a HOE in lens data, the refractive index $n_1$ ($n_2$) of the medium in which the HOE was arranged during fabrication is the refractive index of the medium that is adjacent to the HOE on the side of the point $P_1$ ($P_2$).

In general cases, reference rays and object rays used to fabricate a HOE are not limited to spherical waves. In these cases, the optical path difference function $\Phi_0$ of HOE can be defined by the following equation (13) in which an additional phase term $\Phi_0^{Poly}$ (optical path difference function for the reference wavelength $\lambda_0$) expressed by polynomial terms is added:

$$\Phi_0 = \Phi_0^{2P} + \Phi_0^{Poly} \tag{13}$$

The polynomial $\Phi_0^{Poly}$ is given by:

$$\Phi_0^{Poly} = \sum_j H_j \cdot x^m \cdot y^n$$
$$= H_1 x + H_2 y + H_3 x^2 + H_4 xy + H_5 y^2 + H_6 x^3 + H_7 x^2 y + H_8 xy^2 + H_9 y^3 + \ldots$$

and can be defined, in general, by:

$$j = \{(m+n)^2 + m + 3n\}/2$$

where $H_j$ is the coefficient of each term.

Furthermore, for convenience in optical designing, the optical path difference function $\Phi_0$ may be expressed only by the additional term as follows:

$$\Phi_0 = \Phi_0^{Poly}$$

whereby the HOE can be defined. For example, if the two point light sources $P_1$ and $P_2$ coincide, the component $\Phi_0^{2P}$ of the optical path difference function $\Phi_0$ derived from interference becomes zero. This condition corresponds to the case where the optical path difference function is expressed only by the additional terms (polynomial expression).

The above descriptions regarding HOE are made in reference to a local coordinate system determined by the HOE origin (O in FIG. 21).

An example of the parameter set to define the HOE is shown below:

| Surface Arrangement No. | Radius of Curvature | Separation |
|---|---|---|
| object surface | ∞ | ∞ |
| stop | ∞ | 100 |
| 2 | 150 | −75 |
| HOE: | | |

HV1 ($s_1$) = REA (+1)
HV2 ($s_2$) = VIR (−1)
HOR (m) = 1

| Surface Arrangement No. | Radius of Curvature | Separation |
|---|---|---|
| HX1 = 0, HY1 = −3.40 × 10⁹, HZ1 = −3.40 × 10⁹ | | |
| HX2 = 0, HY2 = 2.50 × 10, HZ2 = −7.04 × 10 | | |
| HWL ($\lambda_0$) = 544 | | |
| $H_1$ = −1.39 × 10⁻²¹ | $H_2$ = −8.57 × 10⁻⁵ | $H_3$ = −1.50 × 10⁻⁴ |

Regarding individual embodiments, explanation and configuration parameters are set forth below. In each embodiment, as described above and shown in FIG. 1 for example, the axial chief ray 2 is defined as a ray travelling from the center of an exit pupil 1 (the rotation center of an eyeball of an observer) to the center of a LCD 5, which is provided as an image display element, via a second unit G2 and a first unit G1. The optical axis, which is defined by the straight line portion of the axial chief ray 2 from the exit pupil 1 to the intersection with the entrance surface of the second unit G2, is defined as Z axis. The axis that intersects Z axis at right angles and that lies in a plane of decentering for each surface constituting the prism member 4 is defined as X axis. The axis that intersects the optical axis and X axis at right angles is defined as Y axis. The center of the exit pupil 1 is determined as the origin of this coordinate system. The direction of the axial chief ray 2 from the exit pupil 1 toward the LCD 5 is defined as a positive direction of Z axis. A direction of X axis that is toward the LCD 5 is defined as a positive direction of X axis. A direction of Y axis that forms a right-hand system along with X axis and Z axis is defined as a positive direction of Y axis.

In each of the first to third embodiments, the prism 4 is decentered in X-Z plane in this coordinate system. Also, each rotationally asymmetric surface provided for the prism 4 has the only plane of symmetry on X-Z plane.

For each decentered surface, amount of displacement (expressed by X, Y, Z for components in X-axis direction, Y-axis direction, Z-axis direction, respectively) of the vertex position of the surface from the origin of the corresponding coordinate system and tilt angles ($\alpha$, $\beta$, $\gamma$ (°)) of the center axis (=Z axis in Equation (4) for a free curved surface) of the surface in reference to X axis, Y axis and Z axis, respectively, are given. A positive value of $\alpha$ or $\beta$ means counterclockwise rotation in reference to the positive direction of the corresponding axis, while a positive value of $\gamma$ means clockwise rotation in reference to the positive direction of Z axis. Other parameters such as radius of curvature of spherical surface, surface separation, refractive index of medium, and Abbe's number are given by the conventional method.

Shape of the free curve surface used in the present invention is defined by Equation (4), where Z axis corresponds to the axis of the free curved surface. However, even if Equation (6) is applied, it does not affect the function and effect of the invention, as a matter of course.

In the first to third embodiments, a LCD with 0.47-inch type display is employed. Regarding the view field angle, horizontal half angle is 12.5° and vertical half angle is 9.44°. The dimensions of the image display element are 9.55×7.16 mm, and the pupil diameter is 4.0 mm.

Figure 2:
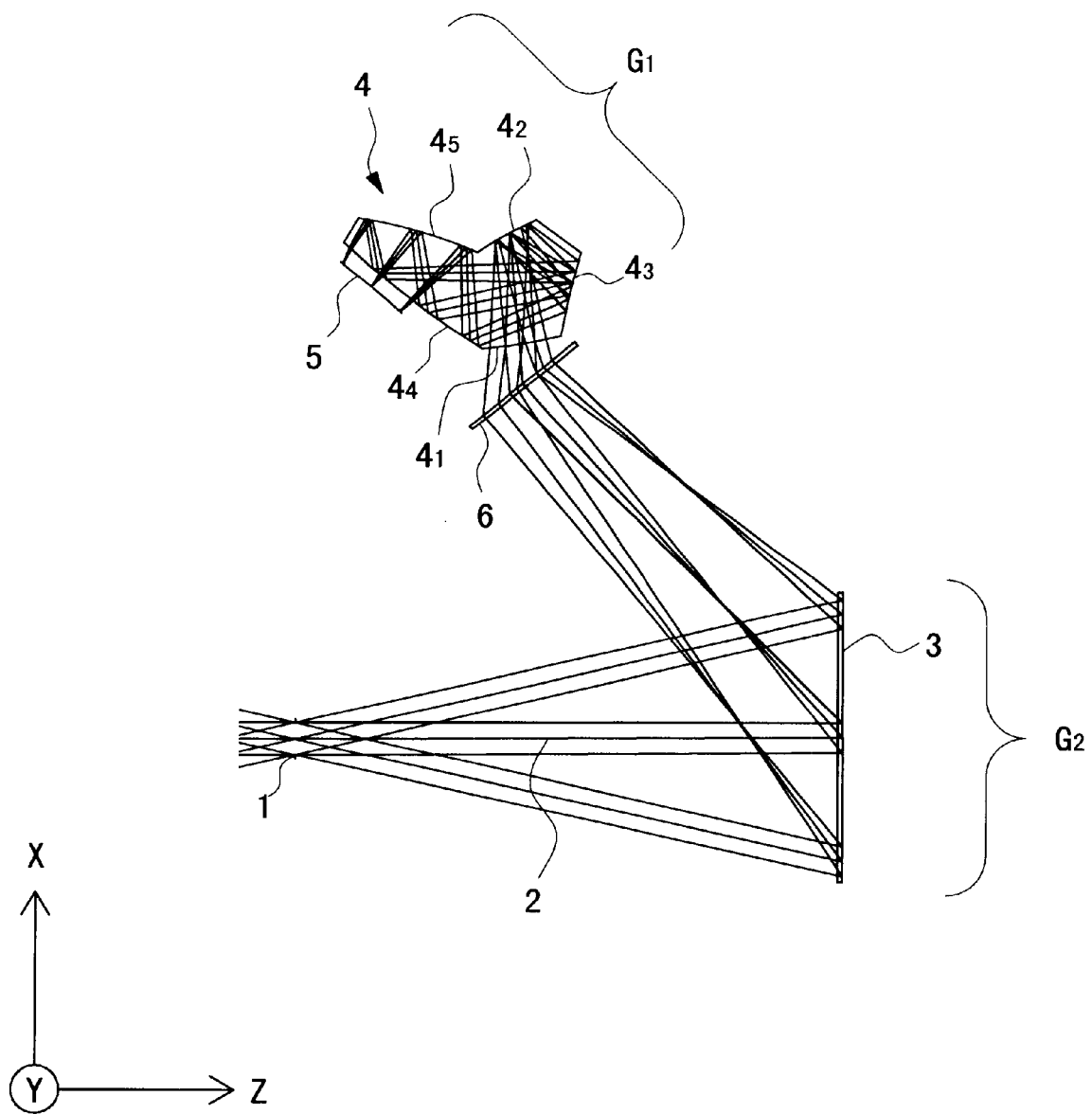
FIG. 2 is a sectional view of an observation optical system according to the second embodiment of the present invention.
Figure 3:
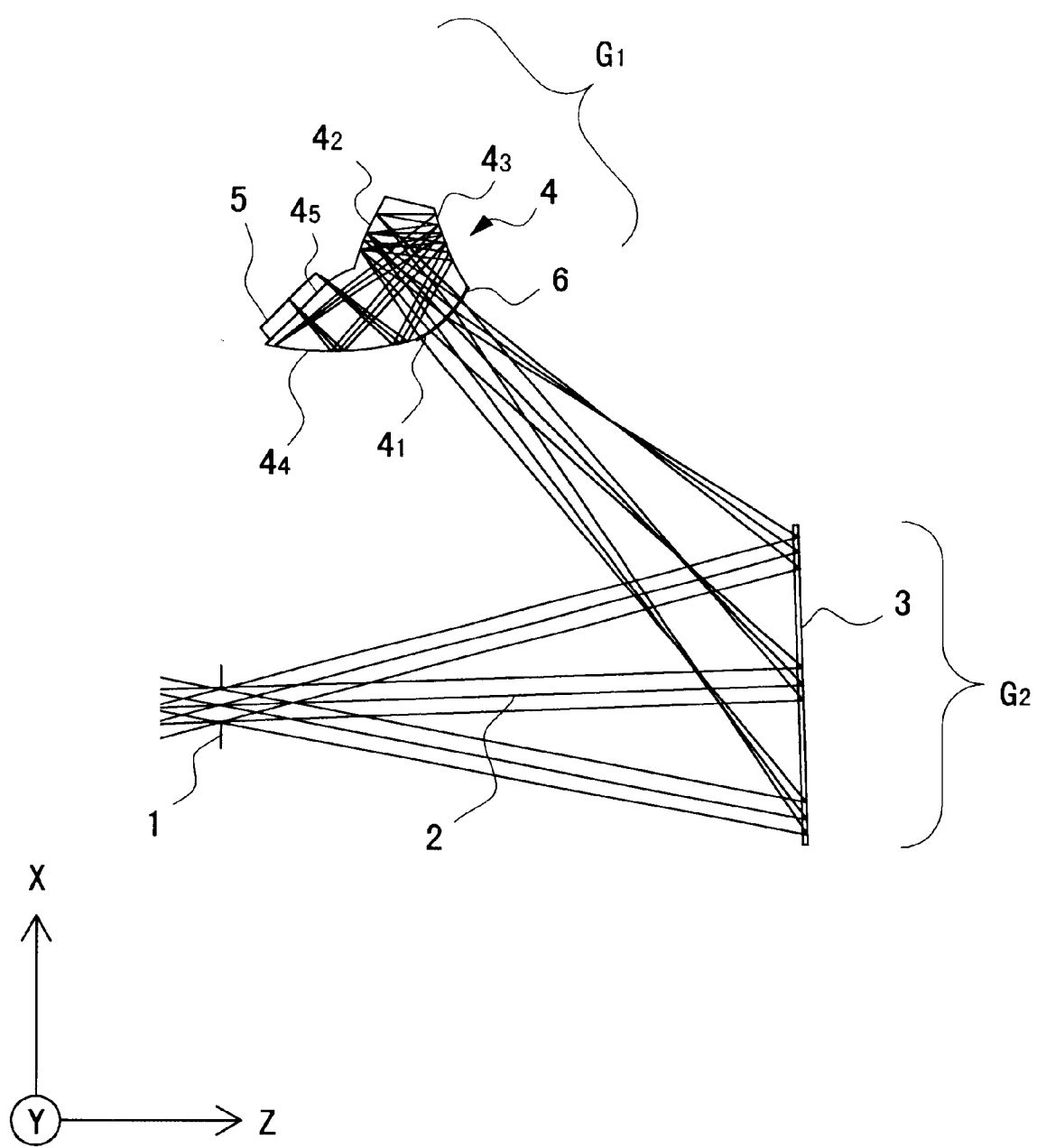
FIG. 3 a sectional view of an observation optical system according to the third embodiment of the present invention.

FIGS. 1–3 are sectional views, as taken along X-Z plane in which the optical axis lies, of the observation optical systems according to the first to third embodiments of the present invention, respectively. The observation optical system of each of the first to third embodiments is composed of a first unit G1 with a positive refracting power and a second unit G2, and forms an exit pupil 1 to allow an observer to view the image displayed on the LCD 5. In the description of each embodiment, surface arrangement numbers in the optical system are assigned, in principle, in order from the exit pupil 1 through the LCD 5 (reverse ray tracing). Description of arrangement order of the surfaces in the prism 4 also conforms to the reverse ray tracing.

First embodiment

As shown in FIG. 1, in the observation optical system of the first embodiment, the first unit G1 consists of a prism 4 having a positive refracting power, and the second unit G2 is composed of a diffraction element 3.

The prism 4 is provided with a first surface $4_1$ through a fifth surface $4_5$. The first surface $4_1$ is configured as an exit surface. The second surface $4_2$ is configured as a third reflecting surface. The third surface $4_3$ is configured as a second reflecting surface. The fourth surface $4_4$ is configured as a first reflecting surface. The fifth surface $4_5$ is configured as an entrance surface. Each of the surfaces is shaped as a rotationally asymmetric free curved surface. The first unit G1 is configured so that light from the LCD 5 enters the prism via the fifth surface $4_5$, exits out of the prism via the first surface $4_1$ after being reflected at the fourth surface $4_4$, the third surface $4_3$, and the second surface $4_2$, and is once imaged after emerging from the prism, to be introduced to the second unit G2.

The diffraction element 3 is are reflection-type volume hologram (Lippmann reflection hologram) formed on a base surface made of transparent material such as glass or plastic. The diffraction element 3 is constructed and arranged so as to reflect the light that is emergent from the prism 4 and once imaged, and to form the exit pupil 1 at the position of the rotation center of the observer's eyeball by diffracting, of light incident thereon, rays with predetermined wavelengths incident thereon at predetermined incident angles while transmitting or reflecting the remaining rays without diffraction. To be specific, it transmits light emergent from the exit pupil side. Also, the diffraction element 3 is configured so as not to exert a power on light transmitted therethrough.

Also, the prism 4 is arranged so that the direction of the axial chief ray 2 as emergent from the exit surface (the first surface $4_1$) is tilted in reference to X direction (0°) by an angle in the range from −25° to +25°, so that the axial chief ray should not directly enter the exit pupil 1.

The numerical data of the first embodiment is shown below. In the data, "FFS" indicates free curved surface. In the following embodiment also, "FFS" indicates free curved surface.

Numerical data 1

| Surface Arrange. Number | Radius of Curvature | Surface Separation | Decentering | Refractive Index | Abbe's Number | |
|---|---|---|---|---|---|---|
| object surface | ∞ | −1000.00 | | | | |
| 1 | stop surface | 0.00 | | | | |
| 2 | ∞ | 0.00 | decentering(1) | 1.5163 | 64.1 | |
| 3 | ∞ | reflecting surface 0.00 | decentering(2) | 1.5163 | 64.1 | HOE[1] |
| 4 | ∞ | 0.00 | decentering(1) | | | |
| 5 | FFS[1] | 0.00 | decentering(3) | 1.4924 | 60.4 | |
| 6 | FFS[2] | reflecting surface 0.00 | decentering(4) | 1.4924 | 60.4 | |
| 7 | FFS[3] | reflecting surface 0.00 | decentering(5) | 1.4924 | 60.4 | |
| 8 | FFS[4] | reflecting surface 0.00 | decentering(6) | 1.4924 | 60.4 | |
| 9 | FFS[5] | 0.00 | decentering(7) | | | |
| image surface | ∞ | 0.00 | decentering(8) | | | |

FFS [1]:

$C_4 = -2.9754 \times 10^{-2}$  $C_6 = -1.2819 \times 10^{-2}$  $C_7 = -1.6617 \times 10^{-4}$
$C_9 = 5.6649 \times 10^{-4}$  $C_{11} = -2.5103 \times 10^{-5}$  $C_{13} = 2.4292 \times 10^{-5}$
$C_{15} = -2.4503 \times 10^{-5}$

FFS[2]:

$C_4 = 1.1988 \times 10^{-2}$  $C_6 = 5.4274 \times 10^{-3}$  $C_7 = 3.0958 \times 10^{-4}$
$C_9 = 2.8427 \times 10^{-4}$  $C_{11} = 5.3774 \times 10^{-6}$  $C_{13} = 2.2944 \times 10^{-5}$
$C_{15} = -8.5674 \times 10^{-6}$

FFS[3]:

$C_4 = 2.0239 \times 10^{-2}$  $C_6 = -7.0968 \times 10^{-3}$  $C_7 = 1.4083 \times 10^{-3}$
$C_9 = 6.9503 \times 10^{-4}$  $C_{11} = 8.3141 \times 10^{-5}$  $C_{13} = 1.0118 \times 10^{-4}$
$C_{15} = -1.7875 \times 10^{-6}$ -continued Numerical data 1
FFS[4]:

| $C_4 = 9.8518 \times 10^{-3}$ | $C_6 = 8.6494 \times 10^{-3}$ | $C_7 = 1.3529 \times 10^{-5}$ |
| $C_9 = -2.0299 \times 10^{-4}$ | $C_{11} = 8.0417 \times 10^{-6}$ | $C_{13} = 1.0480 \times 10^{-5}$ |
| $C_{15} = 9.9201 \times 10^{-6}$ | | |

FFS[5]:

| $C_4 = 5.9889 \times 10^{-3}$ | $C_6 = 2.0333 \times 10^{-2}$ | $C_7 = 4.6661 \times 10^{-4}$ |
| $C_9 = -1.8782 \times 10^{-3}$ | $C_{11} = -2.3775 \times 10^{-4}$ | $C_{13} = -6.6442 \times 10^{-5}$ |
| $C_{15} = -1.6811 \times 10^{-3}$ | | |

HOE[1]:

| HV1 = REA | HV2 = VIR | HOR = 1 |
| $HX1 = 0.476842 \times 10^{13}$ | HY1 = 0 | $HZ1 = -0.314639 \times 10^{14}$ |
| $HX2 = 0.501164 \times 10^{2}$ | HY2 = 0 | $HZ2 = -0.122161 \times 10^{3}$ |
| HWL = 532.00 | | |
| $H_3 = -8.3119 \times 10^{-3}$ | $H_5 = -1.0114 \times 10^{-2}$ | $H_6 = 2.1526 \times 10^{-6}$ |
| $H_8 = -4.2767 \times 10^{-5}$ | $H_{10} = 8.6291 \times 10^{-7}$ | $H_{12} = 7.6093 \times 10^{-7}$ |
| $H_{14} = 1.6841 \times 10^{-6}$ | | |

Decentering [1]:

| X = 0.000 | Y = 0.000 | Z = 70.500 |
| α = 0.000 | β = 0.000 | γ = 0.000 |

Decentering [2]:

| X = 9.780 | Y = 0.000 | Z = 71.158 |
| α = 0.000 | β = 0.000 | γ = 0.000 |

Decentering [3]:

| X = 45.500 | Y = 0.000 | Z = 29.500 |
| α = 0.000 | β = 47.747 | γ = 0.000 |

Decentering [4]:

| X = 55.893 | Y = 0.000 | Z = 20.059 |
| α = 0.000 | β = 25.683 | γ = 0.000 |

Decentering [5]:

| X = 55.307 | Y = 0.000 | Z = 29.322 |
| α = 0.000 | β = 20.633 | γ = 0.000 |

Decentering [6]:

| X = 41.896 | Y = 0.000 | Z = 15.858 |
| α = 0.000 | β = -88.886 | γ = 0.000 |

Decentering [7]:

| X = 46.795 | Y = 0.000 | Z = 11.308 |
| α = -180.000 | β = -47.113 | γ = 180.000 |

Decentering [8]:

| X = 48.260 | Y = 0.000 | Z = 9.947 |
| α = -180.000 | β = -47.113 | γ = 180.000 |

Second Embodiment

As shown in FIG. 2, in the observation optical system of the second embodiment, the first unit G1 is composed of a prism 4 and a diffraction element 6. The prism 4 is provided with a first surface $4_1$ through a fifth surface $4_5$. The first surface $4_1$ is configured as an exit surface. The second surface $4_2$ is configured as a fourth reflecting surface. The third surface $4_3$ is configured as a third reflecting surface. The fourth surface $4_4$ is configured to act both as a second reflecting surface and an entrance surface. The fifth surface $4_5$ is configured as a first reflecting surface. Each of the surfaces is shaped as a rotationally asymmetric free curved surface. The prism 4 is configured so that light from the LCD 5 enters the prism via the fifth surface $4_5$, and exits out of the prism via the first surface $4_1$ after being reflected at the fifth surface $4_5$, the fourth surface $4_4$, the third surface $4_3$, and the second surface $4_2$.

The diffraction element 6 is a transmission-type volume hologram formed on a base surface made of transparent material such as glass or plastic. The diffraction element 6 is constructed and arranged so as to transmit the light that is emergent from the prism 4, and to form the exit pupil 1 at the position of the rotation center of the observer's eyeball by diffracting, of light incident thereon, rays with predetermined wavelengths incident thereon at predetermined incident angles while transmitting or reflecting the remaining rays without diffraction. The first unit G1 according to this embodiment is configured so that the predetermined light emergent from the prism 4 is once imaged after diffracted by the diffraction element 6, and then is incident on the second unit G2. The remaining configuration features are substantially the same as the first embodiment and thus explanation is omitted.

The numerical data of the second embodiment is shown below.

Numerical data 2

| Surface Arrange. Number | Radius of Curvature | Surface Separation | | Decentering | Refractive Index | Abbe's Number | |
|---|---|---|---|---|---|---|---|
| object surface | ∞ | −1000.00 | | | | | |
| 1 | stop surface | 0.00 | | | | | |
| 2 | ∞ | 0.00 | | decentering(1) | 1.5163 | 64.1 | |
| 3 | ∞ | 0.00 | | decentering(2) | | | |
| 4 | ∞ | 0.00 | reflecting surface | decentering(3) | | | HOE[1] |
| 5 | ∞ | 0.00 | | decentering(4) | 1.5163 | 64.1 | |
| 6 | ∞ | 0.00 | | decentering(1) | | | |
| 7 | ∞ | 0.00 | | decentering(5) | 1.5163 | 64.1 | |
| 8 | ∞ | 0.00 | | decentering(6) | | | |
| 9 | ∞ | 0.00 | | decentering(6) | | | HOE[2] |
| 10 | FFS[1] | 0.00 | | decentering(7) | 1.4924 | 60.4 | |
| 11 | FFS[2] | 0.00 | reflecting surface | decentering(8) | 1.4924 | 60.4 | |
| 12 | FFS[3] | 0.00 | reflecting surface | decentering(9) | 1.4924 | 60.4 | |
| 13 | FFS[4] | 0.00 | reflecting surface | decentering(10) | 1.4924 | 60.4 | |
| 14 | FFS[5] | 0.00 | reflecting surface | decentering(11) | 1.4924 | 60.4 | |
| 15 | FFS[4] | 0.00 | | decentering(10) | | | |
| image surface | ∞ | 0.00 | | decentering(12) | | | |

FFS [1]:

$C_4 = -4.1304 \times 10^{-3}$   $C_6 = -1.4810 \times 10^{-2}$   $C_7 = 2.1419 \times 10^{-4}$
$C_9 = 9.0934 \times 10^{-4}$   $C_{11} = -4.3633 \times 10^{-5}$   $C_{13} = -5.3892 \times 10^{-5}$
$C_{15} = -2.2808 \times 10^{-5}$

FFS [2]:

$C_4 = 8.1722 \times 10^{-3}$   $C_6 = -1.6496 \times 10^{-3}$   $C_7 = 2.0515 \times 10^{-4}$
$C_9 = 1.7420 \times 10^{-4}$   $C_{11} = -3.2477 \times 10^{-7}$   $C_{12} = -9.4336 \times 10^{-6}$
$C_{15} = -1.7241 \times 10^{-6}$

FFS [3]:

$C_4 = 6.7919 \times 10^{-3}$   $C_6 = -3.5859 \times 10^{-3}$   $C_7 = 4.7517 \times 10^{-4}$
$C_9 = 1.4057 \times 10^{-4}$   $C_{11} = 1.0379 \times 10^{-5}$   $C_{13} = 1.3969 \times 10^{-5}$
$C_{15} = 5.9732 \times 10^{-6}$

FFS [4]:

$C_4 = 4.5008 \times 10^{-3}$   $C_6 = 1.5240 \times 10^{-2}$   $C_7 = 1.5609 \times 10^{-5}$
$C_9 = 1.6232 \times 10^{-4}$   $C_{11} = -7.3043 \times 10^{-7}$   $C_{13} = 4.2217 \times 10^{-7}$
$C_{15} = 3.4033 \times 10^{-6}$

FFS [5]:

$C_4 = -7.3256 \times 10^{-3}$   $C_6 = 5.3473 \times 10^{-3}$   $C_7 = 1.1646 \times 10^{-4}$
$C_9 = 1.2218 \times 10^{-3}$   $C_{11} = 8.6992 \times 10^{-7}$   $C_{13} = -1.1052 \times 10^{-5}$
$C_{15} = 1.8306 \times 10^{-5}$

HOE [1]:

HV1 = REA   HV2 = VIR   HOR = 1
$HX1 = 0.477449 \times 10^{13}$   $HY1 = 0$   $HZ1 = -0.314639 \times 10^{14}$
$HX2 = 0.514245 \times 10^{2}$   $HY2 = 0$   $HZ2 = -0.120458 \times 10^{3}$
HWL = 532.00
$H_3 = -7.4175 \times 10^{-3}$   $H_5 = -1.0036 \times 10^{-2}$   $H_6 = -2.0965 \times 10^{-5}$
$H_6 = 1.4361 \times 10^{-4}$   $H_{10} = 3.6686 \times 10^{-8}$   $H_{12} = 2.4427 \times 10^{-6}$
$H_{14} = -4.8655 \times 10^{-7}$

HOE [2]:

HV1 = REA   HV2 = REA   HOR = 1
HX1 = 0   HY1 = 0   HZ1 = 0
HX2 = 0   HY2 = 0   HZ2 = 0
HWL = 525.00
$H_1 = 6.4049 \times 10^{-1}$   $H_3 = -8.0495 \times 10^{-3}$   $H_5 = -1.2300 \times 10^{-2}$
$H_6 = -9.0027 \times 10^{-5}$   $H_8 = -2.3110 \times 10^{-4}$   $H_{10} = -8.3738 \times 10^{-8}$
$H_{12} = 3.1376 \times 10^{-6}$   $H_{14} = 3.7008 \times 10^{-6}$ Decentering [1]:

X = 0.000   Y = 0.000   Z = 70.000
α = 0.000   β = 0.000   γ = 0.000

Decentering [2]:

-continued

Numerical data 2

| | | |
|---|---|---|
| X = 0.000 | Y = 0.000 | Z = 70.658 |
| α = 0.000 | β = 0.000 | γ = 0.000 |

Decentering [3]:

| | | |
|---|---|---|
| X = 10.131 | Y = 0.000 | Z = 70.658 |
| α = 0.000 | β = 0.000 | γ = 0.000 |

Decentering [4]:

| | | |
|---|---|---|
| X = 0.000 | Y = 0.000 | Z = 70.658 |
| α = 0.000 | β = 0.000 | γ = 0.000 |

Decentering [5]:

| | | |
|---|---|---|
| X = 44.700 | Y = 0.000 | Z = 29.571 |
| α = 0.000 | β = 52.000 | γ = 0.000 |

Decentering [6]:

| | | |
|---|---|---|
| X = 45.198 | Y = 0.000 | Z = 29.140 |
| α = 0.000 | β = 52.000 | γ = 0.000 |

Decentering [7]:

| | | |
|---|---|---|
| X = 50.188 | Y = 0.000 | Z = 28.823 |
| α = 0.000 | β = 81.362 | γ = 0.000 |

Decentering [8]:

| | | |
|---|---|---|
| X = 64.168 | Y = 0.000 | Z = 27.527 |
| α = 0.000 | β = 61.602 | γ = 0.000 |

Decentering [9]:

| | | |
|---|---|---|
| X = 57.719 | Y = 0.000 | Z = 35.633 |
| α = 0.000 | β = 13.906 | γ = 0.000 |

Decentering [10]:

| | | |
|---|---|---|
| X = 58.843 | Y = 0.000 | Z = 10.950 |
| α = 0.000 | β = −50.975 | γ = 0.000 |

Decentering [11]:

| | | |
|---|---|---|
| X = 64.456 | Y = 0.000 | Z = 15.500 |
| α = 0.000 | β = −74.832 | γ = 0.000 |

Decentering [12]:

| | | |
|---|---|---|
| X = 57.289 | Y = 0.000 | Z = 9.691 |
| α = 0.000 | β = −50.975 | γ = 0.000 |

As shown in FIG. 22, Numerical data 1 of the first embodiment present the volume HOE element 3, to which the surface arrangement number 3 is assigned, as it is attached to the base plate made of a transparent medium. As shown in FIGS. 23A–23B, in Numerical data 2 of the second embodiment, the volume HOE elements 3, 6, to which the surface arrangement numbers 4, 9 are assigned, respectively, are presented as the surfaces different from the base surfaces made of a transparent medium.

In FIGS. 23A–23B, the positions of the transparent base plate and the volume HOE element are schematically shown as displaced from each other. However, in Numerical data 2, the data show that their position coincide so that they may be cemented together. Therefore, in a practical application, the volume HOE element, to which the surface arrangement number 4 or 9 is assigned, can be used as it is cemented to the transparent base plate with adhesive. In each of Numerical data 1 and Numerical data 2, since the optical path difference function, which takes into consideration the entrance side and exit side media, is given, the application can be reduced into realization irrespective of whichever method used to set the numerical data. It is noted that in FIG. 22 and FIGS. 23A–23B, the surface arrangement numbers are shown by ordinal numerals.

Third Embodiment

As shown in FIG. 3, in the observation optical system of the third embodiment, the first unit G1 is composed of a prism 4 and a diffraction element 6 (transmission-type volume hologram) integrally formed on the first surface (exit surface) of the prism 4. The remaining configuration features are substantially the same as the first embodiment and thus explanation is omitted.

Figure 4:
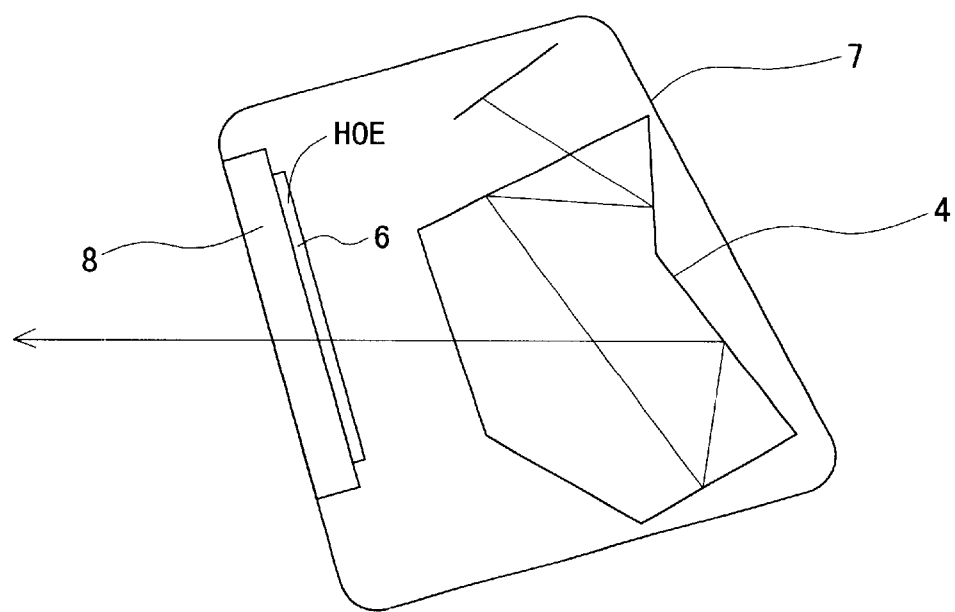
FIG. 4 is a sectional view showing an example of a dust shield member of the first unit applied to the observation optical system according to the present invention.
Figures 5A, 5B:
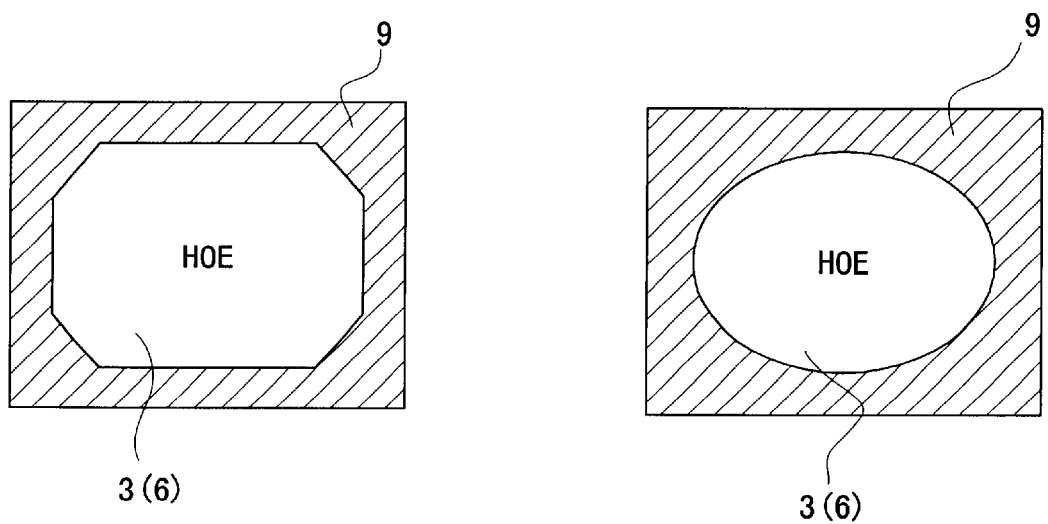
FIGS. 5A–5B are explanatory views to show an example where a diffraction element used in the observation optical system according to the present invention is provided with a stop.

In each of the above-described embodiments, the first unit 1 is preferably covered with a dust shield member. Also, in the case of the second embodiment, as shown in FIG. 4, the diffraction element 6 is provided on the inside surface of the dust cover 8, which constitutes a part of the dust shield member 7, made of transparent material such as glass or plastic.

Also, the diffraction element 3 or 6 used in the embodiments preferably acts as a flare stop upon the periphery thereof being masked with a light interrupting member 9.

Although not shown in FIGS. 1–3, according to the observation optical system of each of the embodiments, the diffraction elements 3, 6 are constructed of three layers of R, G, B so as to show an observer a color image.

Also, the prism used in the image observation optical system of the present invention is not limited to the types of the above-described embodiments. Prisms shown in FIGS. 6–16 may be used.

Figure 6:
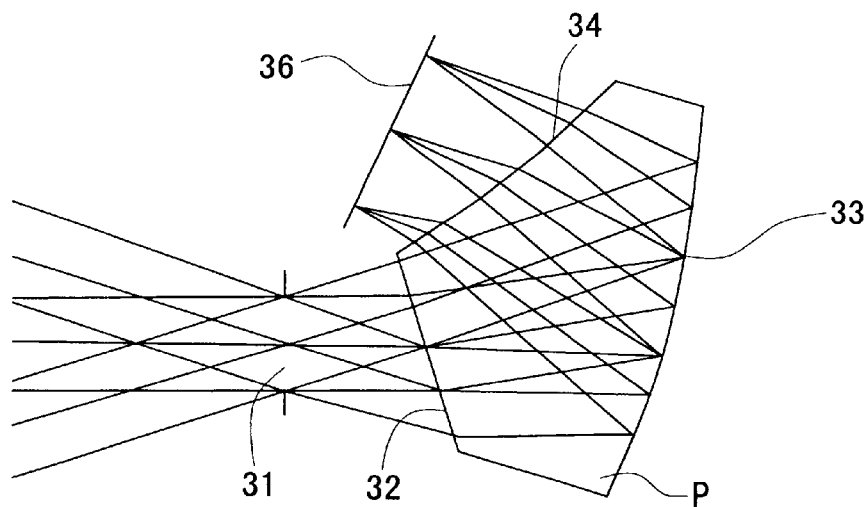
FIG. 6 shows an example of a prism applicable to the prism member of the image observation optical system of the present invention.

In the case of FIG. 6, a prism P is provided with a first surface 32, a second surface 33, and a third surface 34. The first surface 32, the second surface 33, and the third surface 34 are constructed and arranged as an exit surface, a reflecting surface, and an entrance surface, respectively. The prism P is configured so that light from a LCD 36 enters the prism as being refracted at the third surface 34 thereof, is reflected at the second prism 33, exits out of the prism as being refracted at the first surface 32 thereof, and then is imaged on an image surface 31.

Figure 7:
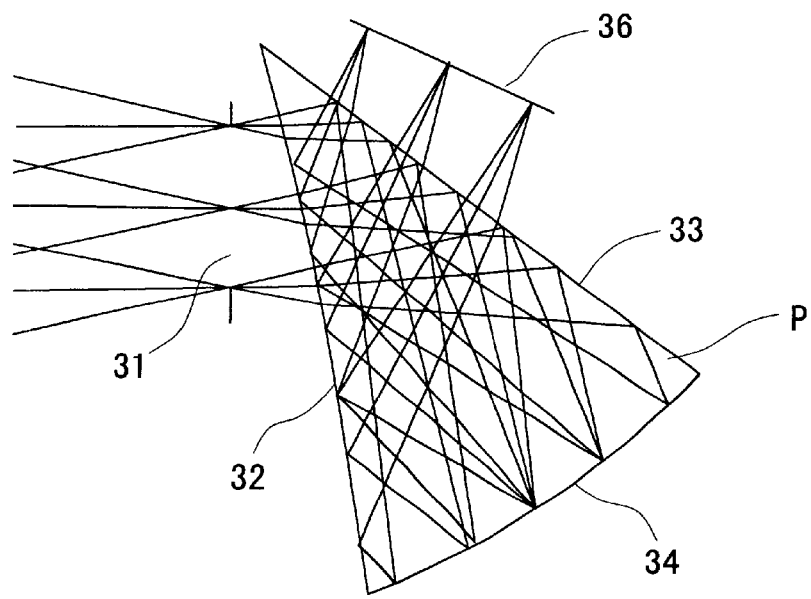
FIG. 7 shows another example of a prism applicable to the prism member of the observation optical system of the present invention.

In the case of FIG. 7, a prism P is provided with a first surface 32, a second surface 33, and a third surface 34. The first surface 32 is constructed and arranged to act both as a first reflecting surface and an exit surface. The second surface 33 is constructed and arranged to act both as a third reflecting surface and an entrance surface. The third surface 34 is constructed and arranged as a second reflecting surface. The prism P is configured so that light from a LCD 36 enters the prism as being refracted at the second surface 33 thereof, is reflected at the first surface 32, and is reflected at the third surface 34, then is reflected at the second surface 33, exits out of the prism as being refracted at the first surface 32 thereof, and is imaged on an image surface 31.

Figure 8:
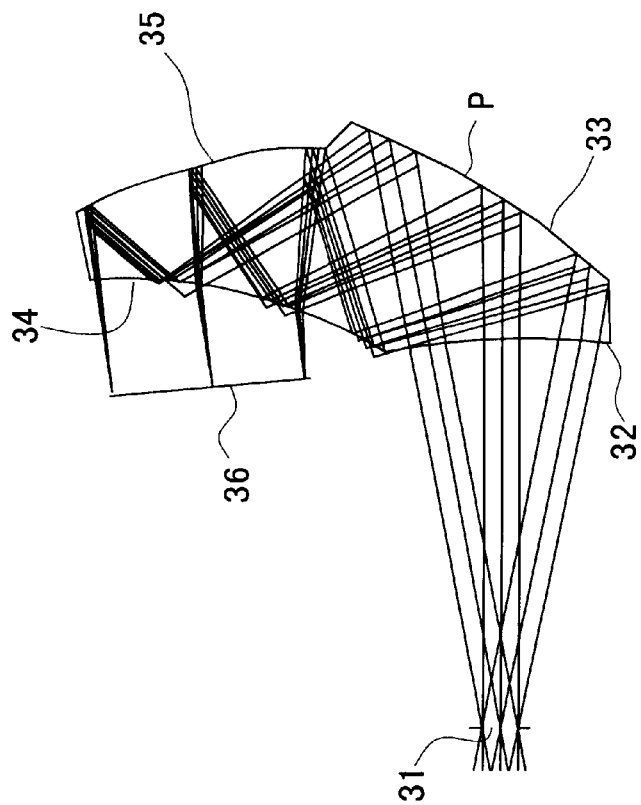
FIG. 8 shows still another example of a prism applicable to the prism member of the observation optical system of the present invention.

In the case of FIG. 8, a prism P is provided with a first surface 32, a second surface 33, a third surface 34, and a fourth surface 35. The first surface 32 is constructed and arranged as an exit surface. The second surface 33 is constructed and arranged as a third reflecting surface. The third surface 34 is constructed and arranged to act both as an entrance surface and a second reflecting surface. The fourth surface 35 is constructed and arranged as a first reflecting surface. The prism P is configured so that light from a LCD 36 enters the prism as being refracted at the third surface 34 thereof, is reflected at the fourth surface 35, then is reflected at the third surface 34, is reflected at the second surface 33, exits out of the prism as being refracted at the first surface 32 thereof, and is imaged on an image surface 31.

Figure 9:
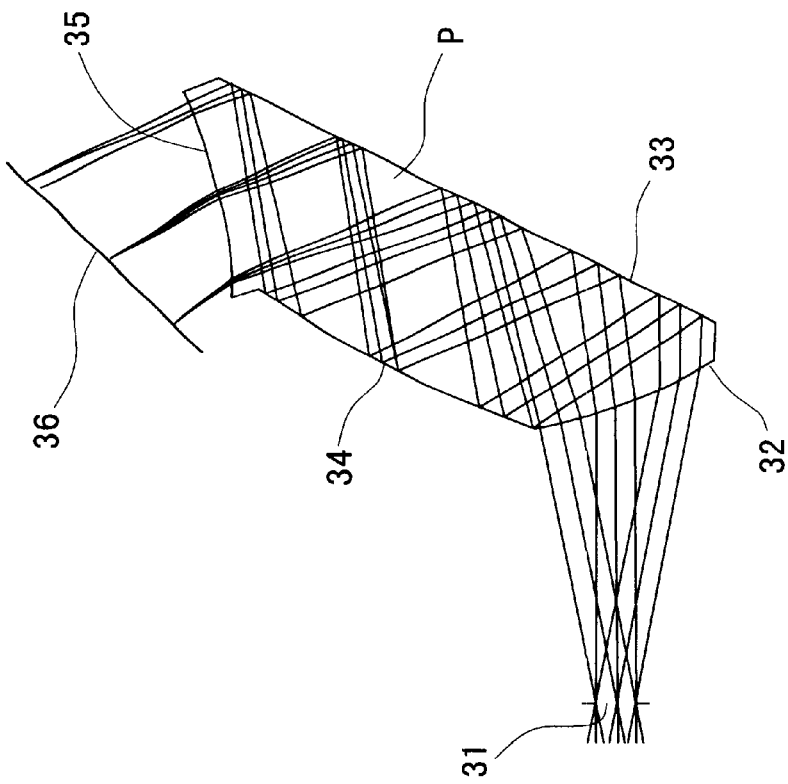
FIG. 9 shows still another example of a prism applicable to the prism member of the observation optical system of the present invention.

In the case of FIG. 9, a prism P is provided with a first surface 32, a second surface 33, a third surface 34, and a fourth surface 35. The first surface 32 is constructed and arranged as an exit surface. The second surface 33 is constructed and arranged to provide, at different positions on the very same surface, a region acting as a first reflecting surface and a region acting as a third reflecting surface. The third surface 34 is constructed and arranged as a second reflecting surface. The fourth surface 35 is constructed and arranged as an entrance surface. The prism P is configured so that light from a LCD 36 enters the prism as being refracted at the fourth surface 35 thereof, is reflected at the first reflecting surface on the second surface 33, is reflected at the third surface 34, then is reflected at the third reflecting surface on the second surface 33, exits out of the prism as being refracted at the first surface 32 thereof, and is imaged on an image surface 31.

Figure 10:
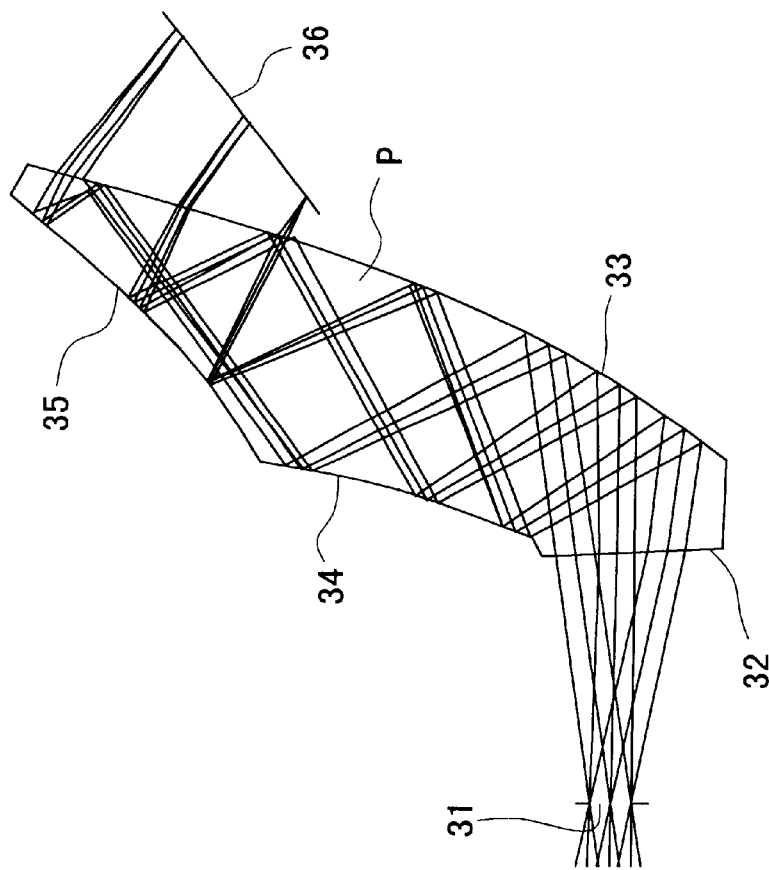
FIG. 10 shows still another example of a prism applicable to the prism member of the observation optical system of the present invention.

In the case of FIG. 10, a prism P is provided with a first surface 32, a second surface 33, a third surface 34, and a fourth surface 35. The first surface 32 is constructed and arranged as an exit surface. The second surface 33 is constructed and arranged to provide, at different positions on the very same surface, a region that acts both as an entrance surface and a second reflecting surface and a region that acts as a fourth reflecting surface. The third surface 34 is constructed and arranged as a third reflecting surface. The fourth surface 35 is constructed and arranged as a first reflecting surface. The prism P is configured so that light from a LCD 36 enters the prism as being refracted at the entrance surface thereof on the second surface 33, is reflected at the fourth surface 35, then is reflected at the second reflecting surface on the second surface 33, is reflected at the third surface 34, then is reflected at the fourth reflecting surface on the second surface 33, exits out of the prism as being refracted at the first surface 32 thereof, and is imaged on an image surface 31.

Figure 11:
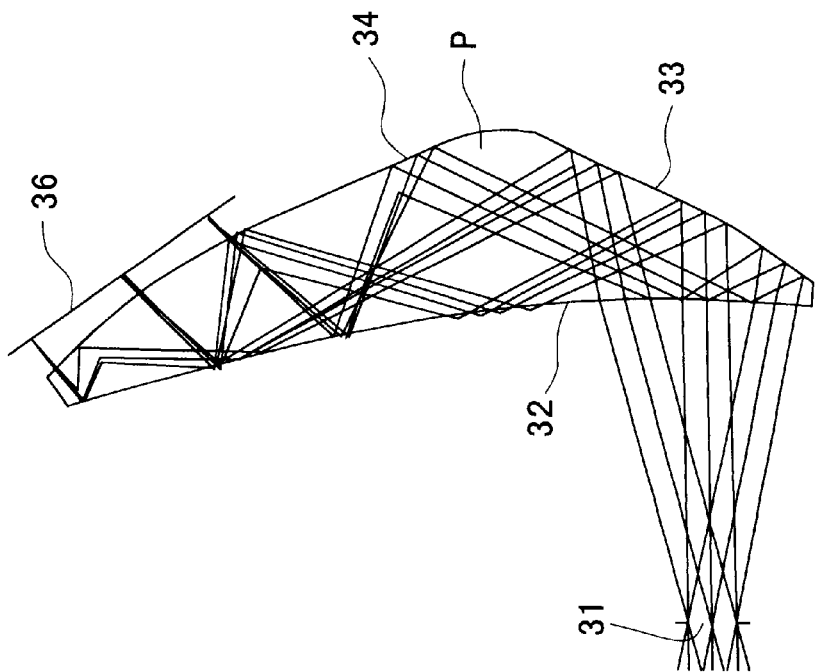
FIG. 11 shows still another example of a prism applicable to the prism member of the observation optical system of the present invention.

In the case of FIG. 11, a prism P is provided with a first surface 32, a second surface 33, and a third surface 34. The first surface 32 is constructed and arranged to act all in one as a first reflecting surface, a third reflecting surface and an exit surface. The second surface 33 is constructed and arranged as a fourth reflecting surface. The third surface 34 is constructed and arranged to act both as an entrance surface and a second reflecting surface. The prism P is configured so that light from a LCD 36 enters the prism as being refracted at the entrance surface thereof on the third surface 34, is reflected at the first reflecting surface on the first surface 32, then is reflected at the second reflecting surface on the third surface 34, is reflected at the third reflecting surface on the first surface 32, is reflected at the second surface 33, then exits out of the prism as being refracted at the exit surface thereof on the first surface 32, and is imaged on an image surface 31.

Figure 12:
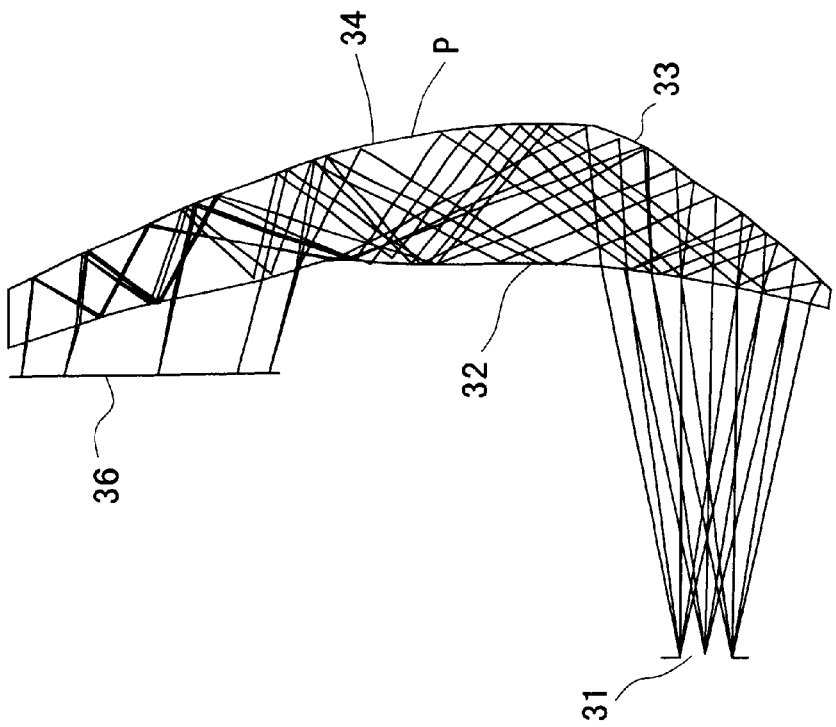
FIG. 12 shows still another example of a prism applicable to the prism member of the observation optical system of the present invention.

In the case of FIG. 12, a prism P is provided with a first surface 32, a second surface 33, and a third surface 34. The first surface 32 is constructed and arranged to act all in one as an entrance surface, a second reflecting surface, a fourth reflecting surface and an exit surface. The second surface 33 is constructed and arranged as a fifth reflecting surface. The third surface 34 is constructed and arranged to act both as a first reflecting surface and a third reflecting surface. The prism P is configured so that light from a LCD 36 enters the prism as being refracted at the entrance surface thereof on the first surface 32, is reflected at the first reflecting surface on the third surface 34, then is reflected at the second reflecting surface on the first surface 32, is reflected at the third reflecting surface on the third surface 34, then is reflected at the fourth reflecting surface on the first surface 32, is reflected at the second surface 33, then exits out of the prism as being refracted at the exit surface thereof on the first surface 32, and is imaged on an image surface 31.

Figure 13:
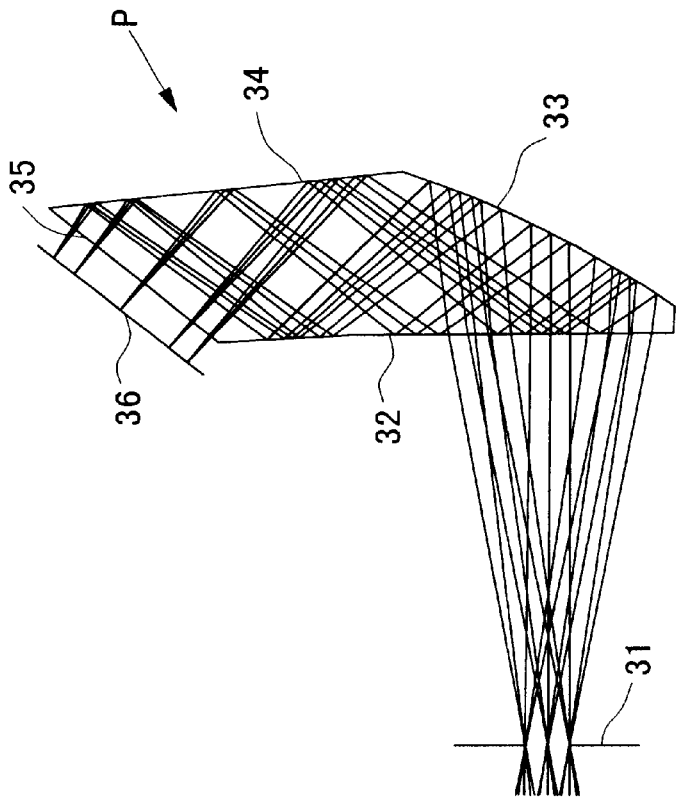
FIG. 13 shows still another example of a prism applicable to the prism member of the observation optical system of the present invention.

In the case of FIG. 13, a prism P is provided with a first surface 32, a second surface 33, a third surface 34, and a fourth surface 35. The first surface 32 is constructed and arranged to act both as a second reflecting surface and an exit surface. The second surface 33 is constructed and arranged as a third reflecting surface. The third surface 34 is constructed and arranged as a first reflecting surface. The fourth surface 35 is constructed and arranged as an entrance surface. The prism P is configured so that light from a LCD 36 enters the prism as being refracted at the fourth surface 35 thereof, is reflected at the third surface 34, then is reflected at the second reflecting surface on the first surface 32, is reflected at the second surface 33, exits out of the prism as being refracted at the exit surface thereof on the first surface 32, and is imaged on an image surface 31.

Figure 14:
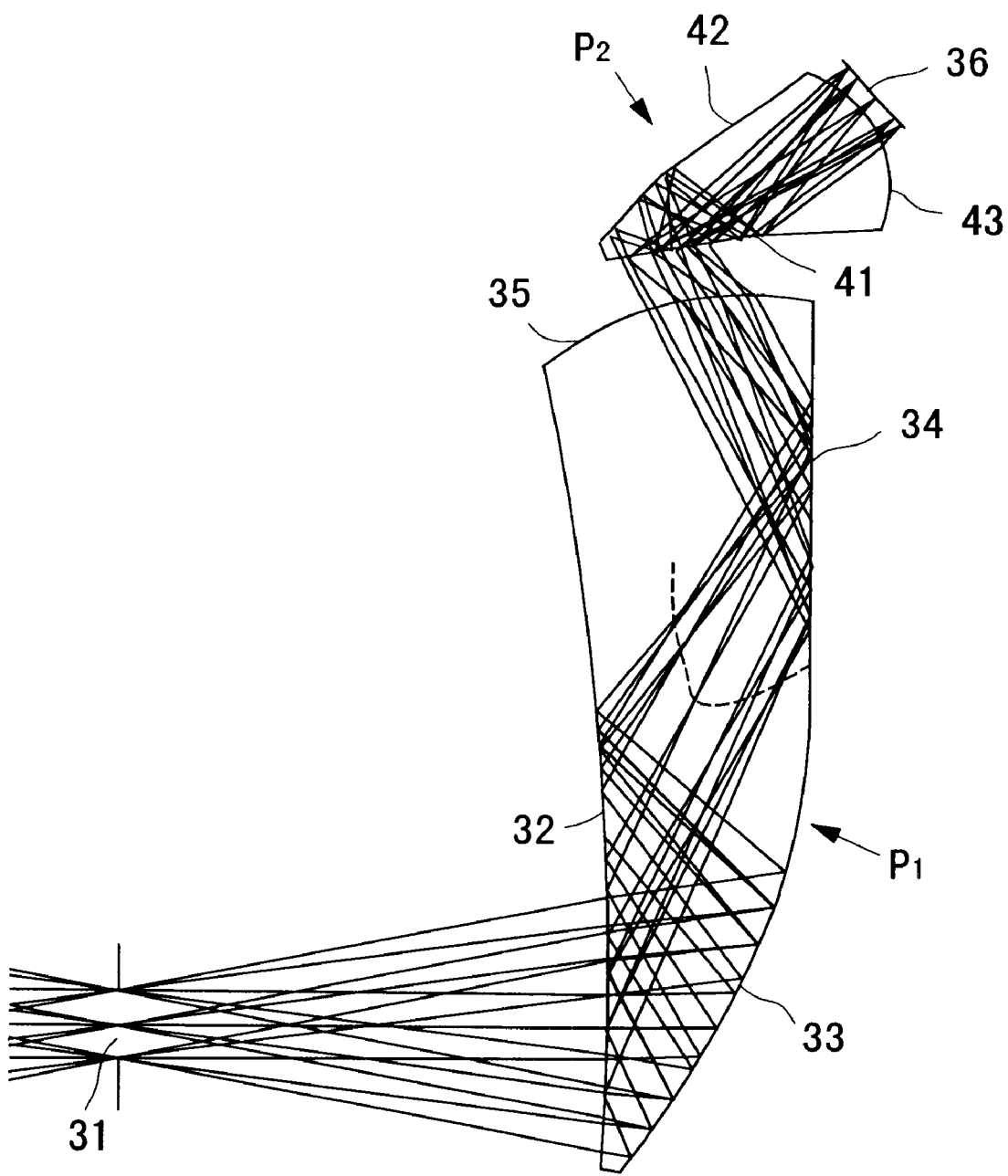
FIG. 14 shows still another example of a prism applicable to the prism member of the observation optical system of the present invention.

In the case of FIG. 14, a prism P includes a first prism P1 and a second prism P2. The first prism P1 is provided with a first surface 32, a second surface 33, a third surface 34, and a fourth surface 35. The first surface 32 is constructed and arranged to act both as a second reflecting surface and an exit surface of the first prism P1. The second surface 33 is constructed and arranged as a third reflecting surface of the first prism P1. The third surface 34 is constructed and arranged as a first reflecting surface of the first prism P1. The fourth surface 35 is constructed and arranged as an entrance surface of the first prism P1. The second prism P2 is provided with a first surface 41, a second surface 42 and a third surface 43. The first surface 41 is constructed and arranged to act both as a first reflecting surface and an exit surface of the second prism P2. The second surface 42 is constructed and arranged as a second reflecting surface of the second prism P2. The third surface 43 is constructed and arranged as an entrance surface of the second prism P2.

The prism P is configured so that light from an LCD 36 enters the second prism P2 as being refracted at the third surface 43 thereof, is reflected at the first reflecting surface on the third surface 43, is reflected at the second surface 42, then exits out of the prism as being refracted at the first surface 41 thereof, enters the first prism P1 as being refracted at the fourth surface 35 thereof, is reflected at the third surface 34, then is reflected at the second reflecting surface on the first surface 32, is reflected at the second surface 33, then exits out of the prism as being refracted at the exit surface thereof on the first surface 32, and is imaged on an image surface 31.

Figure 15:
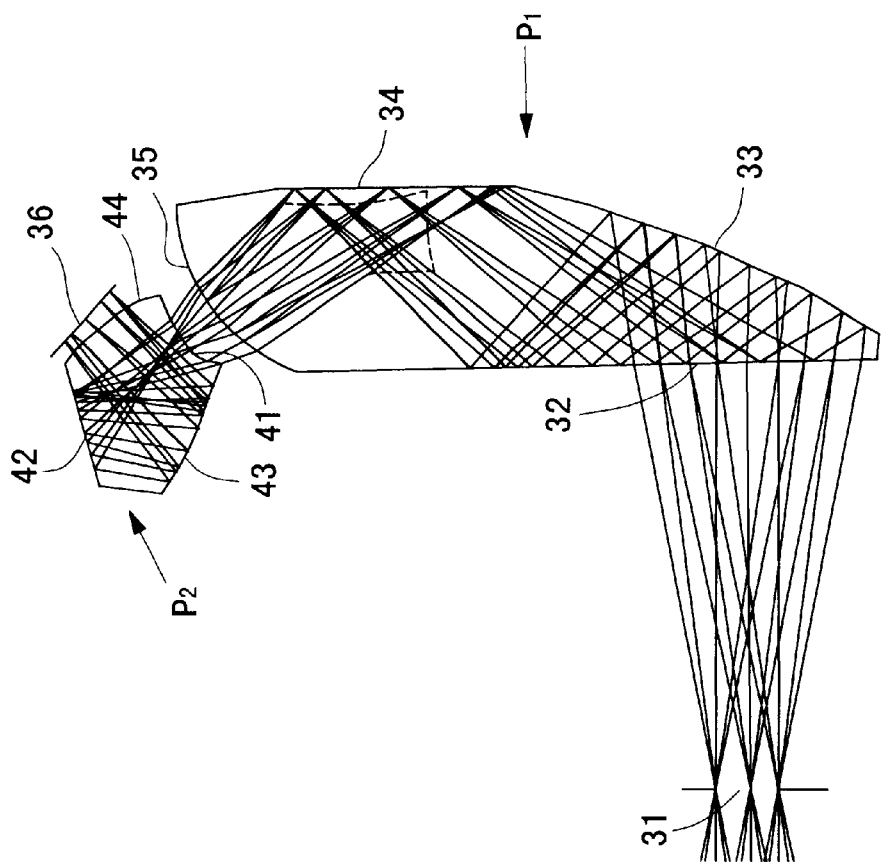
FIG. 15 shows still another example of a prism applicable to the prism member of the observation optical system of the present invention.

In the case of FIG. 15, a prism P includes a first prism P1 and a second prism P2. The first prism P1 is provided with a first surface 32, a second surface 33, a third surface 34, and a fourth surface 35. The first surface 32 is constructed and arranged to act both as a second reflecting surface and an exit surface of the first prism P1. The second surface 33 is constructed and arranged as a third reflecting surface of the first prism P1. The third surface 34 is constructed and arranged as a first reflecting surface of the first prism P1. The fourth surface 35 is constructed and arranged as an entrance surface of the first prism P1. The second prism P2 is provided with a first surface 41, a second surface 42, a third surface 43 and a fourth surface 44. The first surface 41 is constructed and arranged as an exit surface of the second prism P2. The second surface 42 is constructed and arranged as a second reflecting surface of the second prism P2. The third surface 43 is constructed and arranged as a first reflecting surface of the second prism P2. The fourth surface 44 is constructed and arranged as an entrance surface of the second prism P2.

The prism P is configured so that light from a LCD 36 enters the second prism P2 as being refracted at the fourth surface 44 thereof, is reflected at the third surface 43, is reflected at the second surface 42, exits out of the prism as being refracted at the first surface 41 thereof, then enters the first prism P1 as being refracted at the fourth surface 35 thereof, is reflected at the third surface 34, then is reflected at the second reflecting surface on the first surface 32, is reflected at the second surface 33, then exits out of the prism as being refracted at the exit surface thereof on the first surface 32, and is imaged on an image surface 31.

Figure 16:
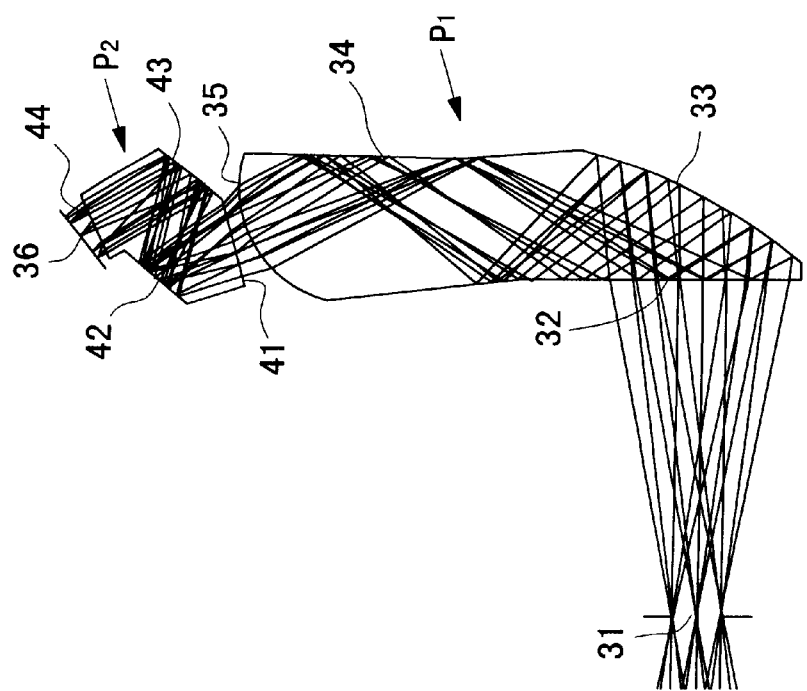
FIG. 16 shows still another example of a prism applicable to the prism member of the observation optical system of the present invention.

In the case of FIG. 16, a prism P includes a first prism P1 and a second prism P2. The first prism P1 is provided with a first surface 32, a second surface 33, a third surface 34, and a fourth surface 35. The first surface 32 is constructed and arranged to act both as a second reflecting surface and an exit surface of the first prism P1. The second surface 33 is constructed and arranged as a third reflecting surface of the first prism P1. The third surface 34 is constructed and arranged as a first reflecting surface of the first prism P1. The fourth surface 35 is constructed and arranged as an entrance surface of the first prism P1. The second prism P2 is provided with a first surface 41, a second surface 42, a third surface 43 and a fourth surface 44. The first surface 41 is constructed and arranged as an exit surface of the second prism P2. The second surface 42 is constructed and arranged as a second reflecting surface of the second prism P2. The third surface 43 is constructed and arranged as a first reflecting surface of the second prism P2. The fourth surface 44 is constructed and arranged as an entrance surface of the second prism P2.

The prism P is configured so that light from an LCD 36 enters the prism P2 as being refracted at the fourth surface 44 thereof, is reflected at the third surface 43, is reflected at the second surface 42, exits out of the prism as being refracted at the first surface 41 thereof, then enters the first prism P1 as being refracted at the fourth surface 35 thereof, is reflected at the third surface 34, then is reflected at the second reflecting surface on the first surface 32, is reflected at the second surface 33, then exits out of the prism as being refracted at the exit surface thereof on the first surface 32, and is imaged on an image surface 31. The prism of FIG. 15 and the prism of FIG. 16 show the following difference in configuration. Regarding the path between the third surface and the fourth surface and the path between the first surface and the second surface in the second prism P2, they do not intersect each other according to FIG. 15, while they do intersect each other according to FIG. 16.

Next, descriptions will be made of the modes in which the above-described image observation optical system according to the present invention is reduced into realization in an image display apparatus.

Figure 17:
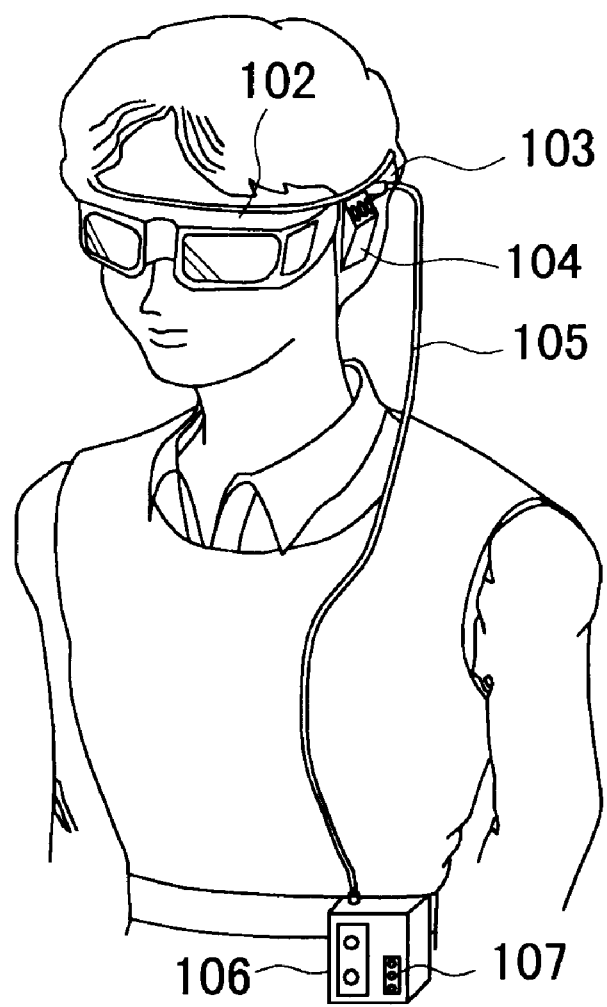
FIG. 17 is a view of a head-mount type binocular image display apparatus using the observation optical system according to the present invention, as it is fit to the head of an observer.
Figure 18A:
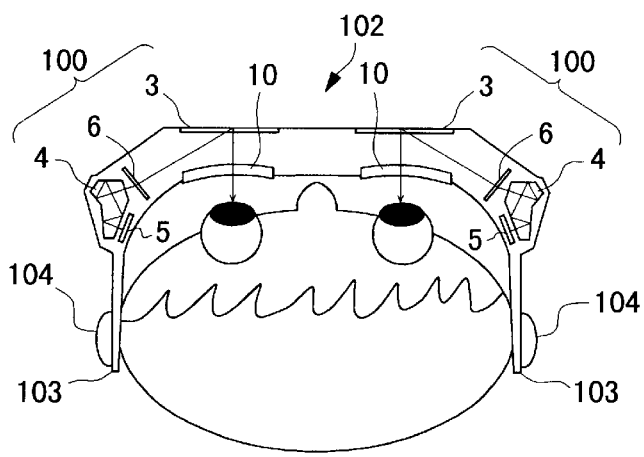
FIG. 18A shows the apparatus of FIG. 17 configuration, and FIG. 18B.

As an example, a head-mount type binocular image display apparatus is explained in reference to FIG. 17 and FIG. 18A. As shown in FIG. 18A, this apparatus is configured to use the observation optical system according to the present invention as an eyepiece optical system 100 provided with an image display element 5. A pair of such eyepiece optical systems 100 are provided and held spaced away from each other by the interpupillary distance, to form a stationary-type or portable-type image display apparatus such as a head-mount type image display apparatus for binocular observation.

The above-described observation optical system is used in a main frame 102 of the image display apparatus as an eyepiece optical system 100. A pair of such eyepiece optical systems 100 are provided as left and right systems. Image display elements 5 constructed of liquid crystal display elements are disposed on the respective image surfaces of the optical systems. As shown in FIG. 17, side-head frames 103 are coupled to the main frame 102 on the lateral sides thereof so as to hold the main frame 102 in front of the eyes of the observer. While FIG. 18A shows a configuration where spectacle lenses 10 are integrally incorporated inside the main frame 102 of the image display apparatus, the image display apparatus may be configured not to incorporate spectacle lenses 10.

Also, each of the side-head frame 103 is equipped with a speaker 104 so that the observer can enjoy stereophony, in addition to the image. The main frame 102 provided with the speakers 104 as described above is connected with a player unit 106 for a portable video cassette or the like via a video/audio transmission cord 105. The observer can enjoy image and sound upon holding the player unit 106 to an arbitrary position, for example to her or his waist belt position, as shown in the drawing. In FIG. 17, the reference numeral 107 represents a control section including a switch, a volume control etc. of the player unit 106. Electronic devices such as video processing and audio processing circuits are built in the main frame 102.

The end of the cord 105 may be formed as a jack to be plugged in an existing video deck etc. Also, the cord 105 may be connected with a TV tuner, which receives broadcasting waves, for observation of TV programs, or may be connected with a computer to receive images of computer graphics or text messages. Alternatively, the apparatus may be provided with an antenna for receiving external signals carried by radio waves, for the purpose of removing the cord, which is obstructive.

Figure 18B:
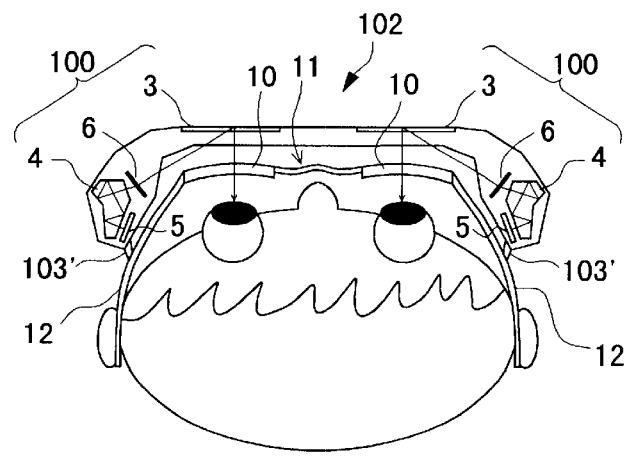
FIG. 18C shows modification examples of FIG. 18A.

Alternatively, as shown in FIG. 18B, the main frame 102 may be configured so that support members 103' achieve removable mount on side frames 12 of spectacles 11 while not incorporating therein the spectacle lenses 10. In this configuration, the speaker 104 shown in FIG. 18A may be attached to the support member 103'.

Figure 18C:
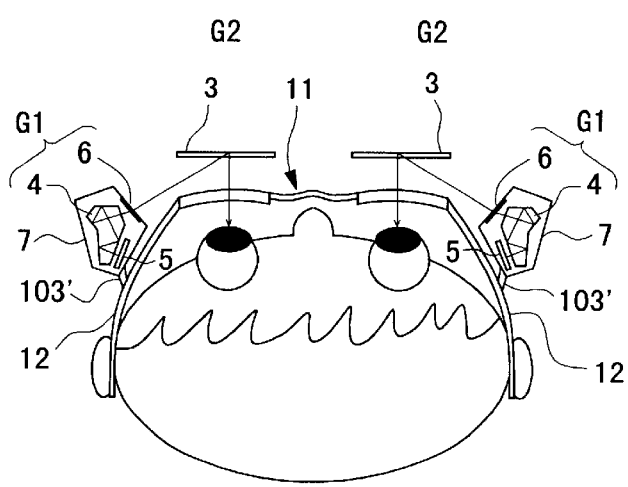

Alternatively, as shown in FIG. 18C, the configuration may be made so that, for each of the left and right view systems, the first unit G1 and the image display element 5 are covered with a dust shield member, which achieves removable mount on the side frame 12 of the spectacles. In this configuration, the diffraction element 3 of the second unit G2 is connected with the dust shield member 7 via a frame or the like not shown.

Figure 19:
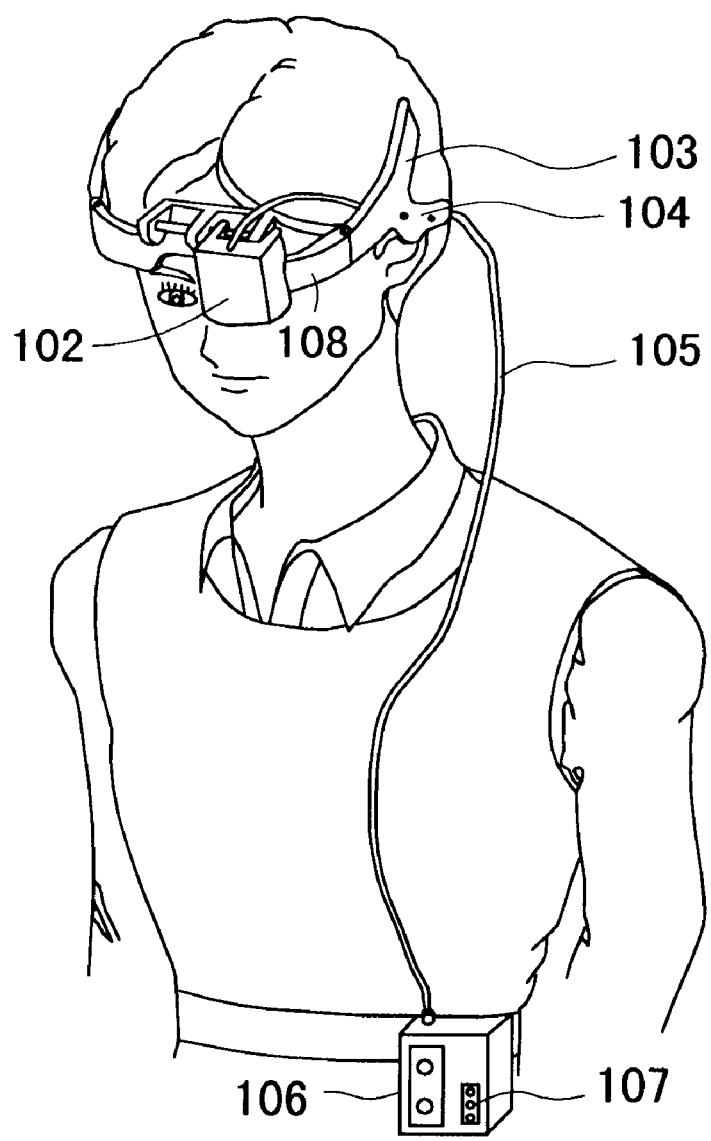
FIG. 19 is a view of a head-mount type monocular image display apparatus using the observation optical system according to the present invention, as it is fit to the head of an observer.

Also, as shown in FIG. 19, the observation optical system according to the present invention may be applied to a head-mount type monocular image display apparatus, which is designed so that an eyepiece optical system is held in front of either eye (in the drawing, in front of the left eye) of an observer. In this configuration, a main frame 102 which is provided with a set including an eyepiece optical system 100 and an image display element 5 is mounted on a front frame 108 at a position in front of the corresponding eye. Side-head frames 103 shown in the figure are coupled to the front frame 108 on the lateral sides thereof so as to hold the main frame 102 in front of the odd eye of the observer. Other features are similar to those of the foregoing binocular configurations shown in FIGS. 17, 18A–18C and thus explanation about them is omitted here.

Figure 20:
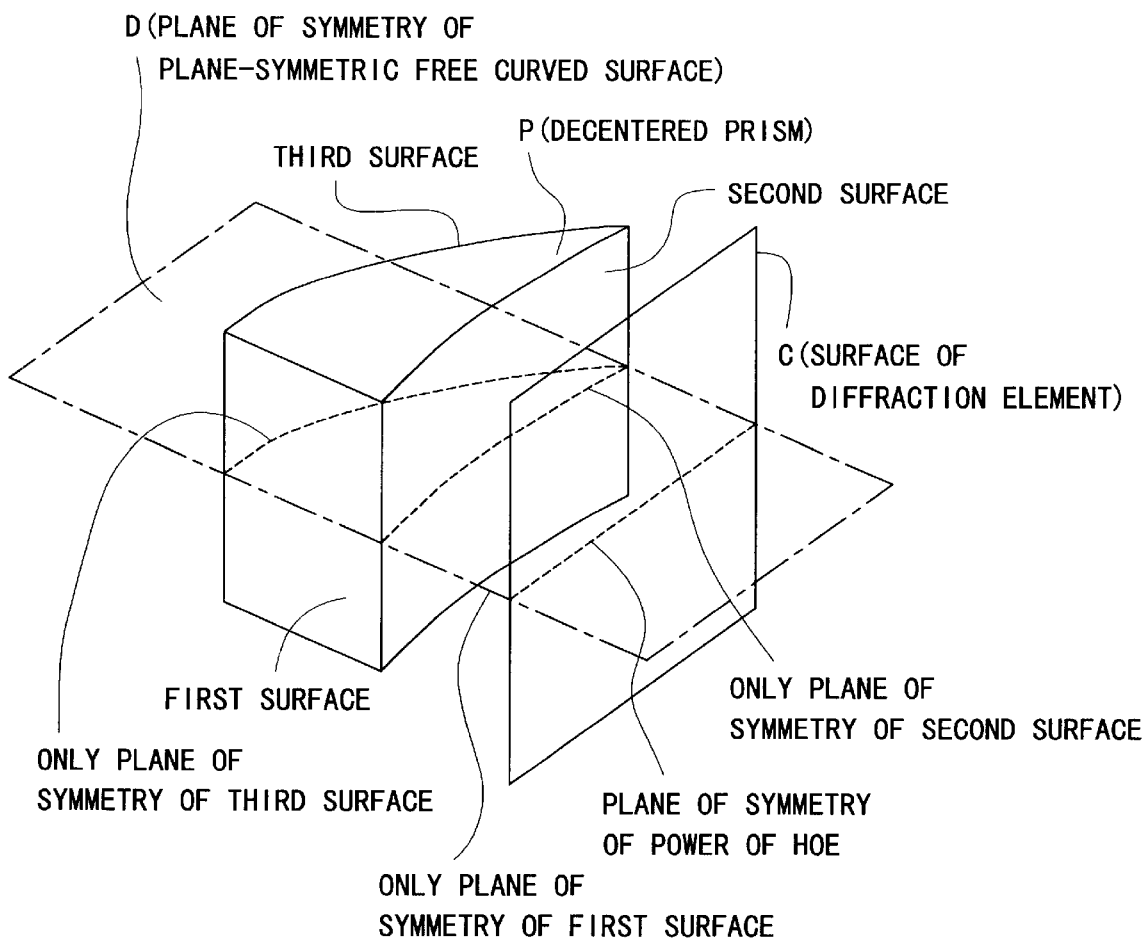
FIG. 20 shows a desirable arrangement of the diffraction element in the first unit according to the present invention.

Next, in reference to FIG. 20, a desirable arrangement in combining a diffraction element and a prism according to the present invention is explained. In the drawing, a decentered prism P corresponds to the prism included in the image observation optical system of the present invention. In the case where a surface C of the diffraction element is shaped quadrangular as shown in the drawing, it is desirable, for beautiful image forming, to make arrangement so that a plane of symmetry D of a plane-symmetric free curved surface on the decentered prism P is parallel to at least one side of the quadrangular surface C of the diffraction element.

Furthermore, if the surface C of the diffraction element forms a regular square or a rectangle with all of its interior angles being substantially 90°, it is desirable to make arrangement so that the plane of symmetry D of the plane-symmetric free curved surface is parallel to two opposite sides of the surface C and that the plane of symmetry D coincides with a horizontal or vertical plane of symmetry of the surface C of the diffraction element. Such an arrangement facilitates assembly accuracy and thus is effective for mass production.

Furthermore, if a plurality or all of optical surfaces constituting the decentered prism P such as the first surface, the second surface, and the third surface are plane-symmetric free curved surfaces, it is desirable, in view of design convenience and in aberration performance also, to make arrangement so that the planes of symmetry of all of the plane-symmetric surfaces are arranged on the common plane D. It is also desirable to satisfy the above-mentioned relationship between the plane of symmetry D and a plane of symmetry of power of HOE of the diffraction element.

As discussed above, according to the present invention, the optical system can be made compact enough to be usable as an image display apparatus for a cellular phone or a portable intelligent terminal, and can achieve high image definition and wide field angle while controlling chromatic aberration of magnification to be small.

What is claimed is:

1. An observation optical system which forms an exit pupil for observation of an electronic image displayed on an image display element and which has a positive refracting power as a whole, comprising:
   a first unit having a positive refracting power; and
   a second unit;
   wherein said first unit comprises at least one prism member having a positive refracting power; and
   said second unit comprises a diffraction element having a lens function caused by diffraction,
   wherein said first unit has an action of imaging the electronic image for obtaining a relay image,
   said second unit has an action for forming the exit pupil for introducing the relay image into an observer,
   said prism member has:
      an entrance surface via which bundles of rays emergent from the image display element enter said prism member;
      at least one reflecting surface on which the bundles of rays reflect inside said prism member; and
      an exit surface via which the bundles of rays exit out of said prism member;
   at least one of said reflecting surface and said exit surface is shaped as a curved surface which exerts a power on the bundles of rays, said curved surface being a rotationally asymmetric surface constructed and arranged to compensate aberrations caused by determining.

2. An observation optical system according to claim 1, wherein said diffraction element of said second unit is a reflection-type one.

3. A head-mount type image display apparatus comprising:
   a main frame provided with an image display element and an image observation optical system according to claim 1 which is arranged as an eyepiece optical system; and
   a support member constructed to be mounted on lateral sides of a head of an observer so as to hold said main frame in front of a face of the observer.

4. A head-mount type image display apparatus according to claim 3, wherein said eyepiece optical system and an optical system for spectacles are integrally arranged in said main frame.

5. A head-mount type image display apparatus according to claim 3, wherein said support member is constructed to achieve removable mount to side frames of spectacles.

6. A head-mount type image display apparatus according to claim 3, wherein a pair of said observation optical systems are arranged in parallel as left and right systems for providing binocular view.

7. An observation optical system which forms an exit pupil for observation of an electronic image displayed on an image display element and which has a positive refracting power as a whole, comprising:
   a first unit having a positive refracting power; and
   a second unit;
   wherein said first unit comprises at least one prism member having a positive refracting power; and
   said second unit comprises a diffraction element having a lens function caused by diffraction,
   wherein said first unit has an action of imaging the electronic image for obtaining a relay image,
   said second unit has an action for forming the exit pupil for introducing the relay image into an observer,
   said prism member has:
      an entrance surface via which bundles of rays emergent from the image display element enter said prism member;
      at least one reflecting surface on which the bundles of rays reflect inside said prism member; and an exit surface via which the bundles of rays exit out of said prism member;

at least one of said reflecting surface and said exit surface is shaped as a curved surface which exerts a power on the bundles of rays, said curved surface being a rotationally asymmetric surface constructed and arranged to compensate aberrations caused by decentering, and wherein said second unit exerts no power on bundles of rays transmitted therethrough.

8. An observation optical system which forms an exit pupil for observation of an electronic image displayed on an image display element and which has a positive refracting power as a whole, comprising:

a first unit having a positive refracting power; and a second unit;

wherein said first unit comprises at least one prism member having a positive refracting power; and said second unit comprises a diffraction element having a lens function caused by diffraction, wherein said first unit has an action of imaging the electronic image for obtaining a relay image, said second unit has an action for forming the exit pupil for introducing the relay image into an observer, said prism member has:

an entrance surface via which bundles of rays emergent from the image display element enter said prism member;

at least one reflecting surface on which the bundles of rays reflect inside said prism member; and an exit surface via which the bundles of rays exit out of said prism member;

at least one of said reflecting surface and said exit surface is shaped as a curved surface which exerts a power on the bundles of rays, said curved surface being a rotationally asymmetric surface constructed and arranged to compensate aberrations caused by decentering, and wherein said first unit comprises a diffraction element.

9. An observation optical system according to claim 8, wherein said diffraction element of said first unit is a transmission-type volume hologram.

10. An observation optical system according to claim 8, wherein said diffraction element of said first unit is disposed on the exit surface of said prism member.

11. An observation optical system according to claim 8, wherein said diffraction element of said first unit is provided with a flare stop.

12. An observation optical system according to claim 8, wherein said diffraction element of said second unit is a reflection-type volume hologram.

13. An observation optical system according to claim 8, wherein said diffraction element of said second unit is provided with a flare stop.

14. An observation optical system according to claim 8, wherein said prism member has at least two reflecting surfaces which reflect the bundles of rays inside said prism member.

15. An observation optical system according to claim 8, wherein said at least one reflecting surface is shaped as a curved surface which exerts a power on the bundles of rays, said curved surface being a rotationally asymmetric surface constructed and arranged to compensate aberrations generated by decentering.

16. An observation optical system according to claim 8, wherein said prism member has at least two reflecting surfaces, each of which is shaped as a curved surface which exerts a power on the bundles of rays, said curved surface being a rotationally asymmetric surface constructed and arranged to compensate aberrations caused by decentering.

17. An observation optical system according to claim 8, wherein said prism member is constructed and arranged so that a direction of an axial chief ray as emergent from aid prism member is averted from the exit pupil.

18. An observation optical system according to claim 17, wherein the direction of the axial chief ray as emergent from said prism member satisfies the following condition:

$$-25° \leq \theta \leq 25°$$

where $\theta$ is a tilt angle of the axial chief ray as emergent from said prism member in reference to a direction of X axis which is taken as 0°, the X axis being defined as an axis that intersects Z axis at right angles in a plane of decentering of each surface constituting said prism member, the Z direction being defined by a straight line portion of the axial chief ray from the exit pupil to a most pupil-side surface of said second unit.

19. An observation optical system according to claim 18, wherein the following condition is satisfied:

$$-15° \leq \theta \leq 15°.$$

20. An observation optical system according to claim 18, wherein the following condition is satisfied:

$$-5° \leq \theta 5°.$$

21. An observation optical system according to claim 8, wherein said first unit is covered with a dust shield member.

22. An observation optical system according to claim 21, wherein said dust shield member of said first unit is provided with an encasement which accommodates said first unit and a cover which transmits light emergent from said first unit.

23. An observation optical system according to claim 22, wherein said diffraction element of said first unit is provided on a surface of said cover as a base surface.

* * * * *

UNITED STATES PATENT AND TRADEMARK OFFICE
CERTIFICATE OF CORRECTION

PATENT NO.   : 6,636,356 B2
DATED        : October 21, 2003
INVENTOR(S)  : Takeyama It is certified that error appears in the above-identified patent and that said Letters Patent is hereby corrected as shown below:

<u>Column 28,</u>
Line 41, correct the formula to read,
-- $-5^0 \leqq \theta \leqq 5^0$ --

Signed and Sealed this

First Day of June, 2004

JON W. DUDAS
*Acting Director of the United States Patent and Trademark Office*